July 28, 1959 O. KILE ET AL 2,896,537
IMPRINTING MACHINE
Original Filed Aug. 23, 1954 14 Sheets-Sheet 1

Inventors,
OTHO KILE,
ERNEST J. SARRING
By: Schroeder, Hofgren,
Brady & Wegner
Attorneys

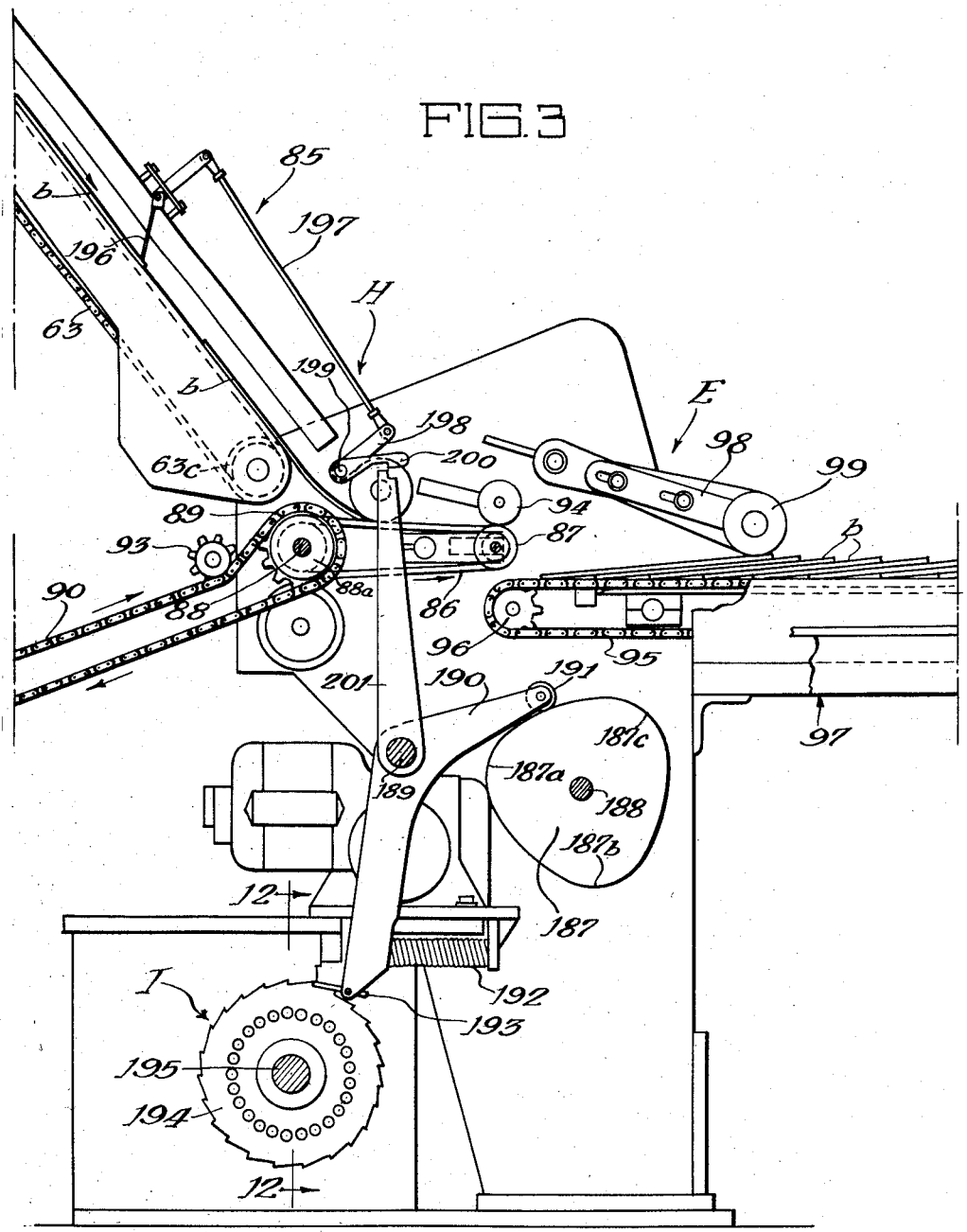

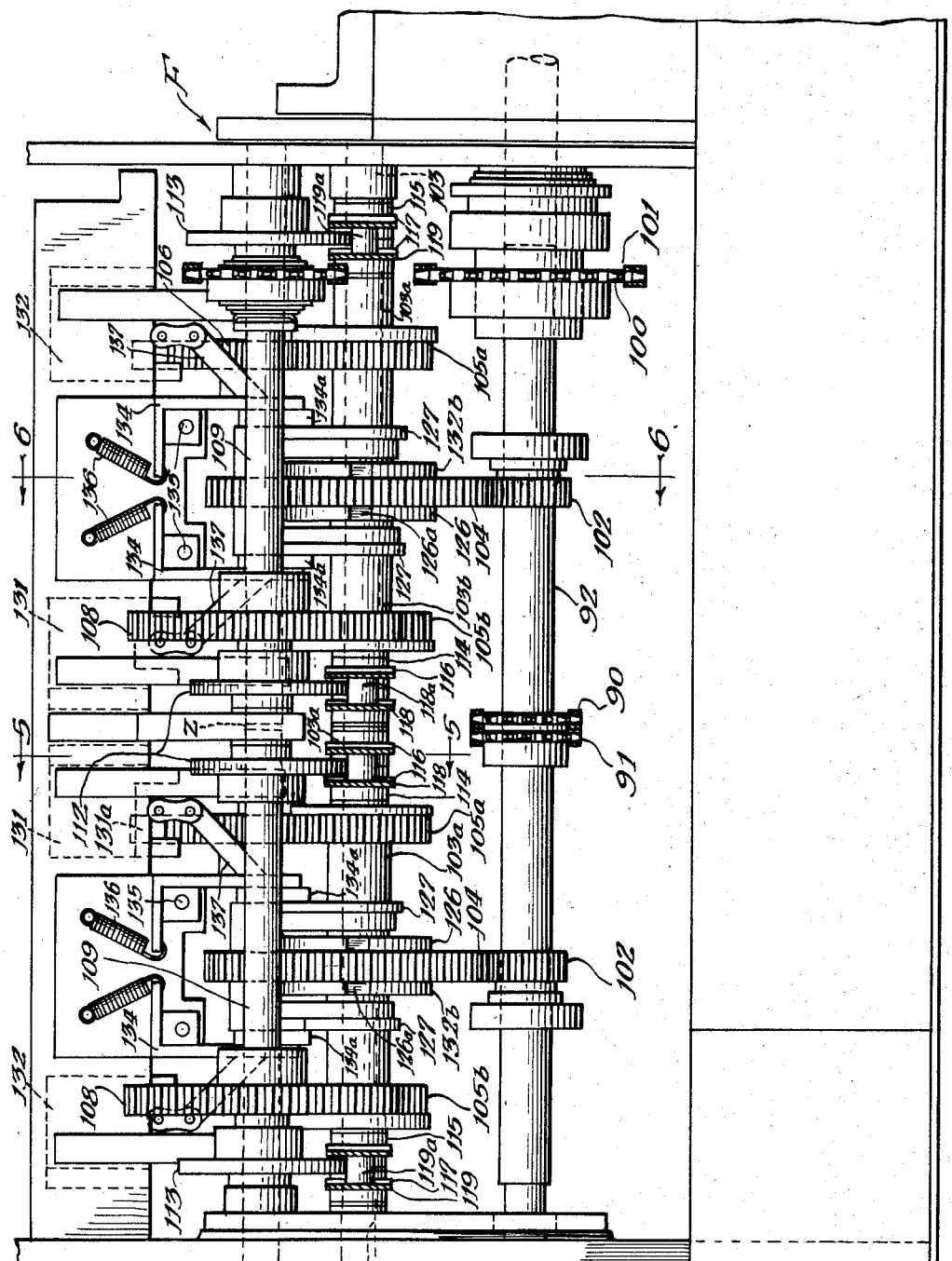

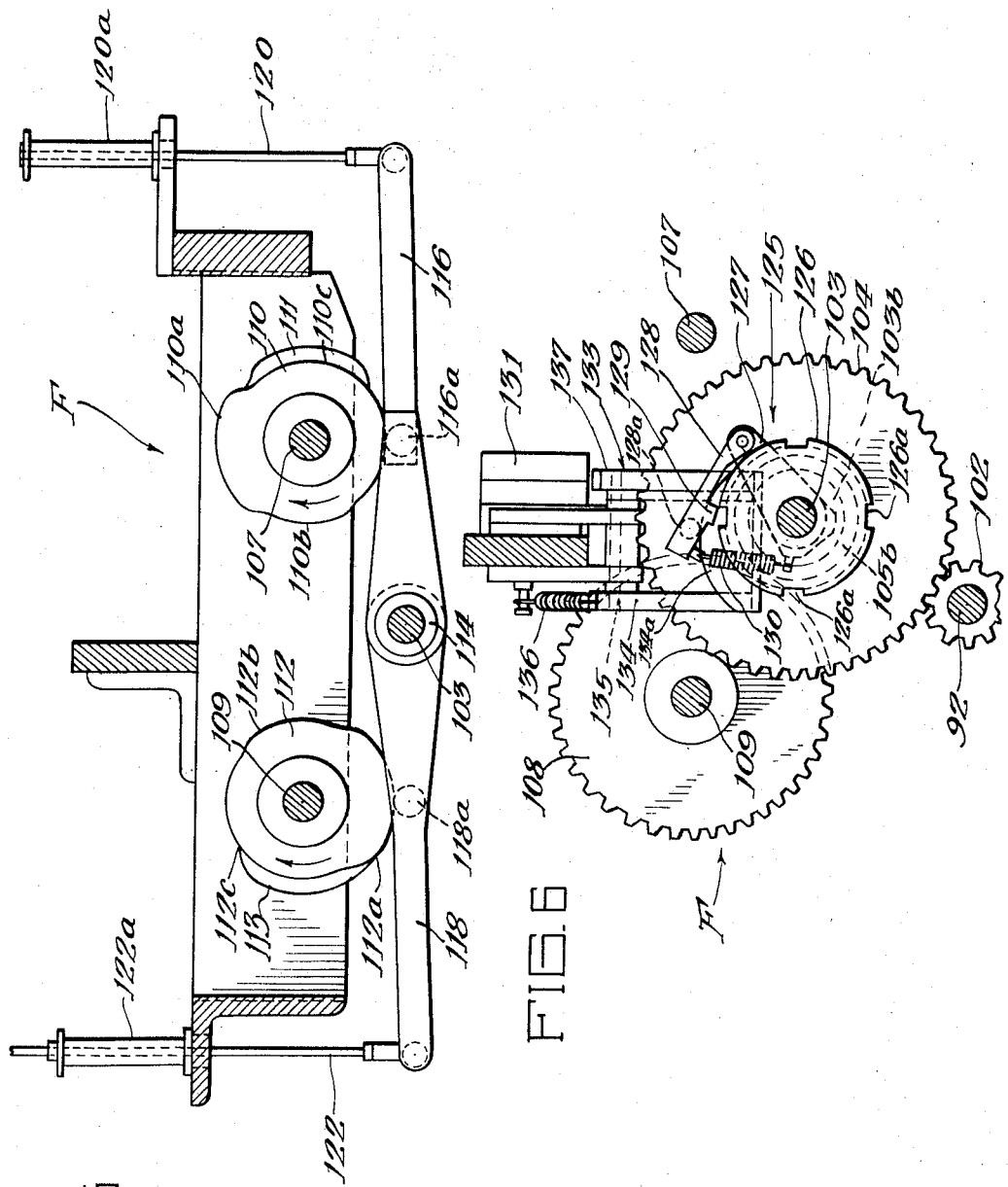

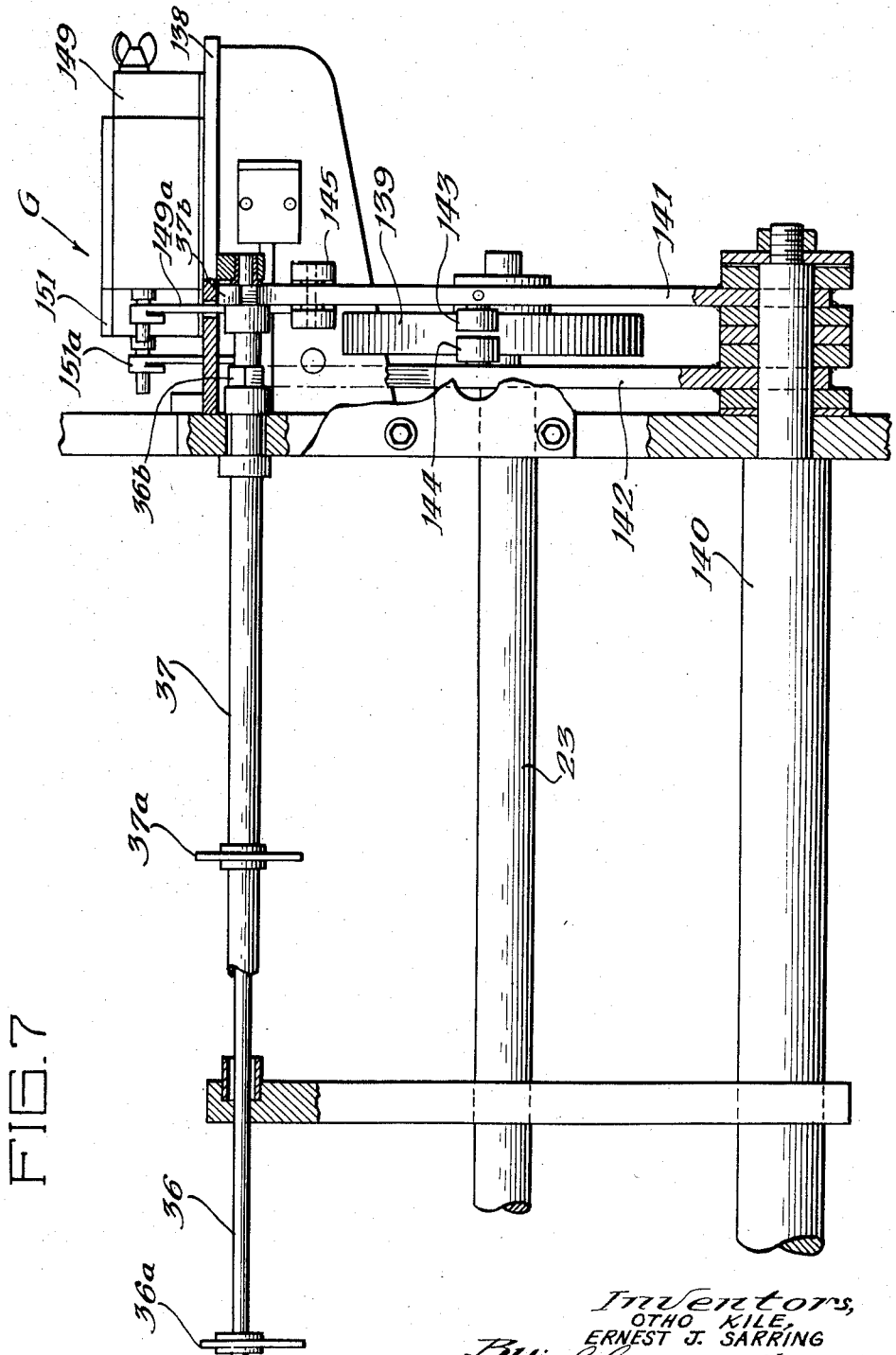

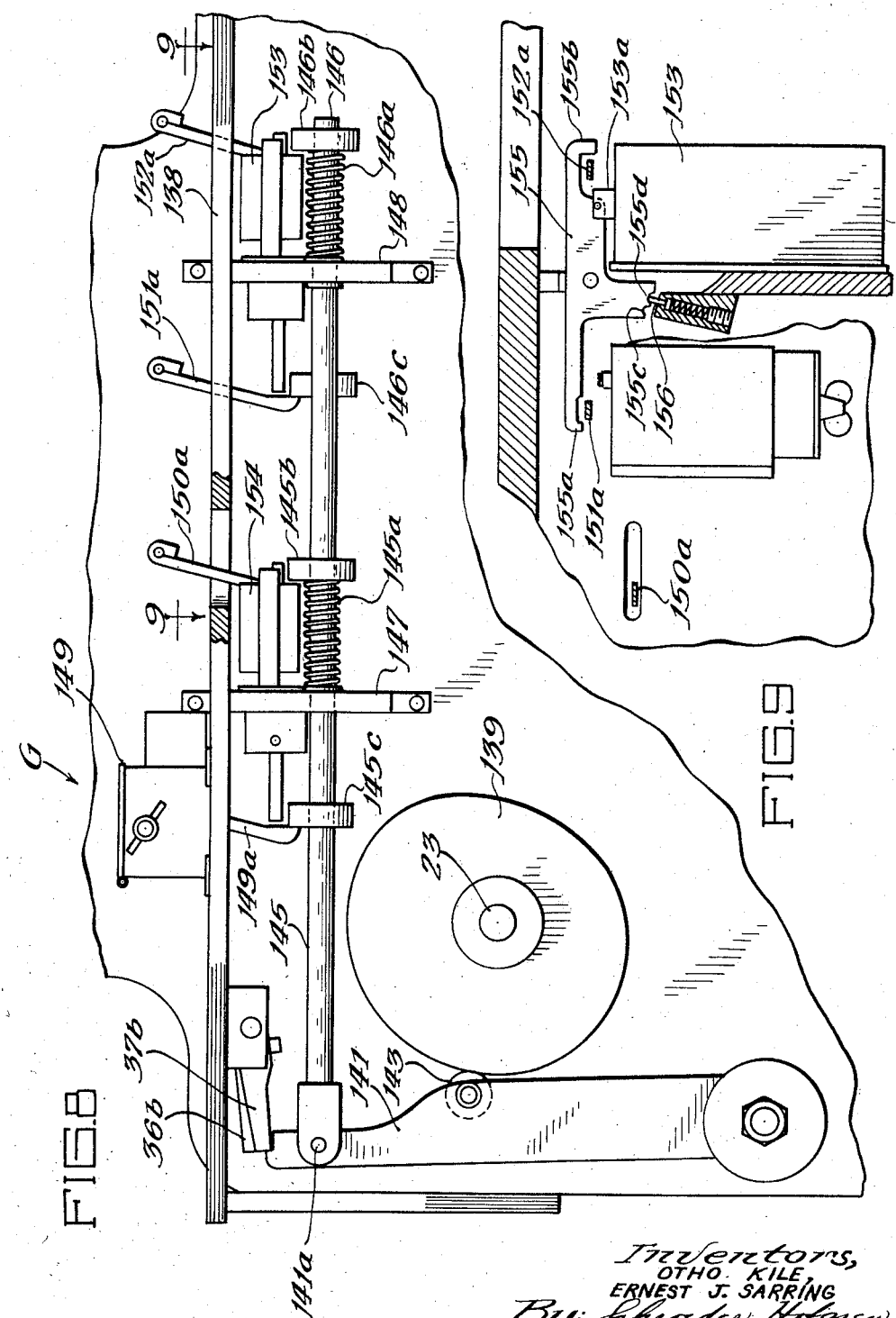

July 28, 1959
O. KILE ET AL
2,896,537
IMPRINTING MACHINE
Original Filed Aug. 23, 1954
14 Sheets-Sheet 8
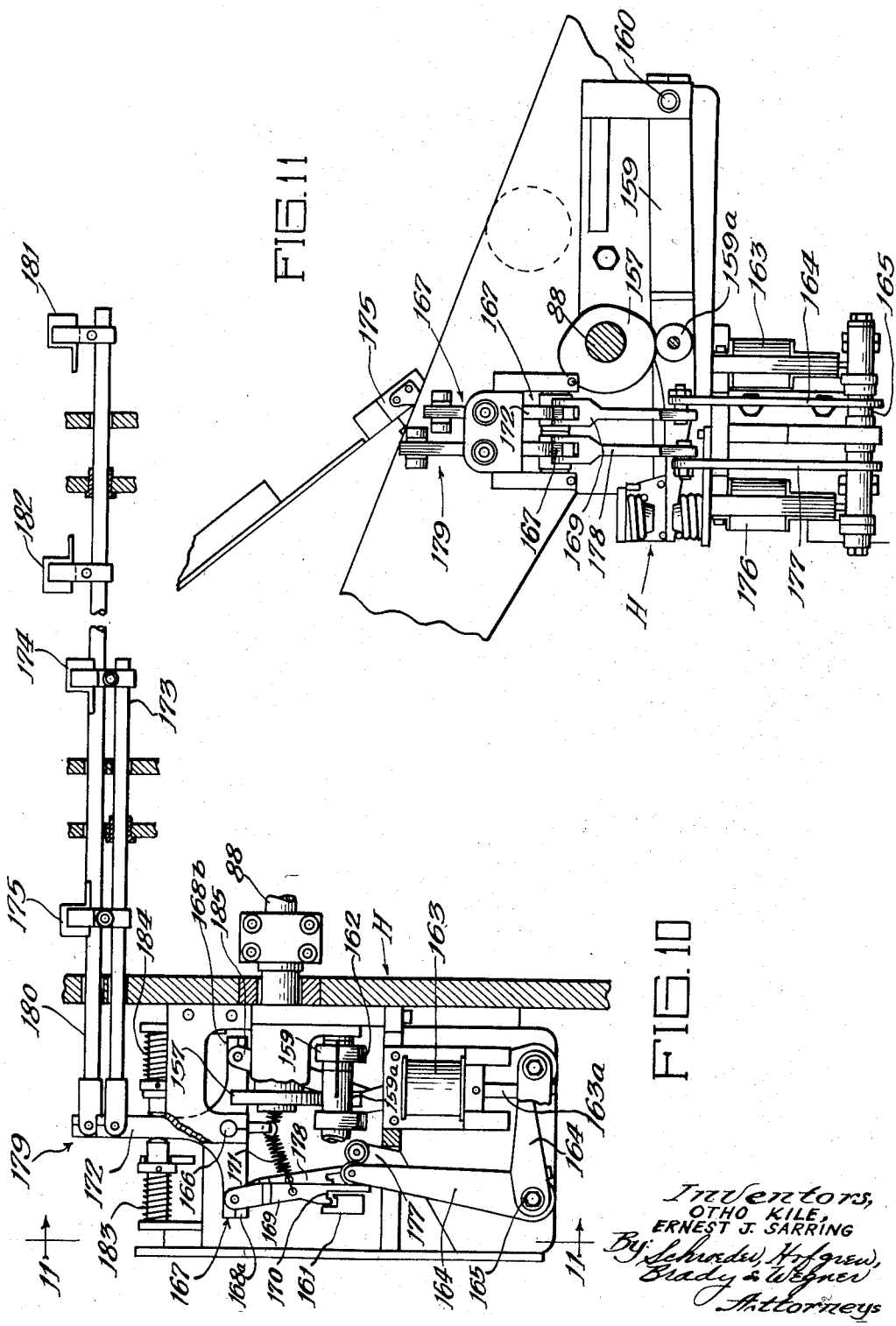

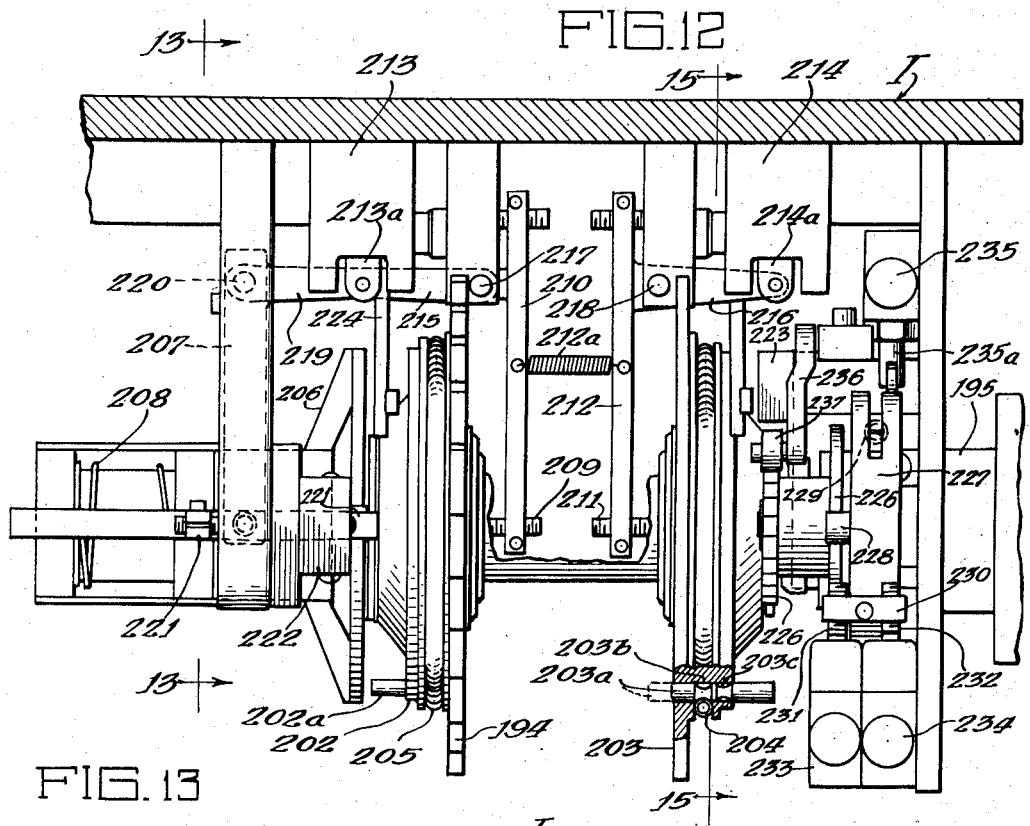
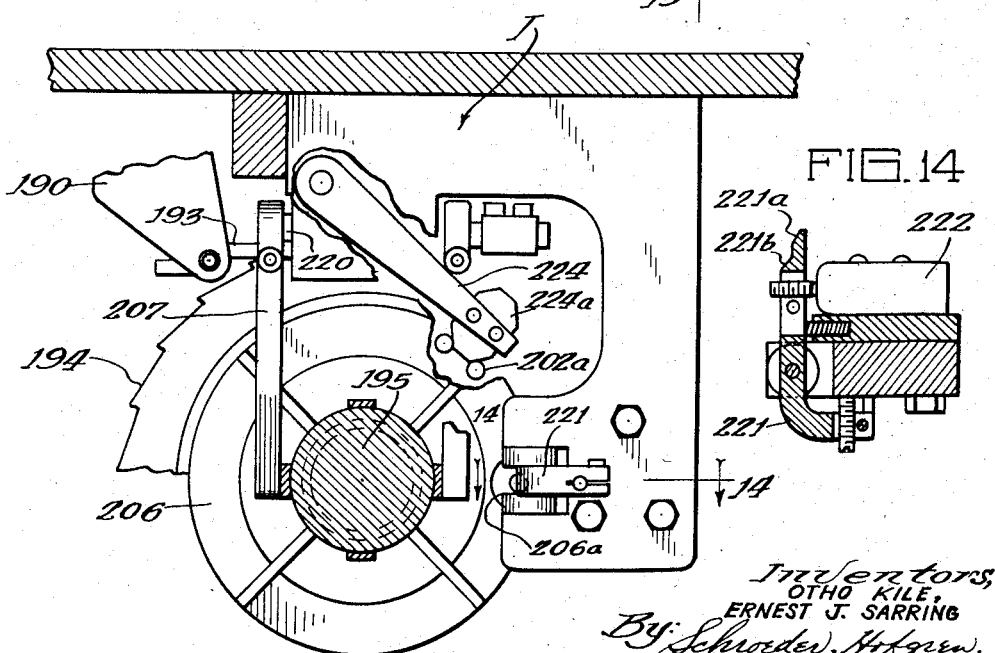

July 28, 1959     O. KILE ET AL     2,896,537
IMPRINTING MACHINE
Original Filed Aug. 23, 1954     14 Sheets-Sheet 10
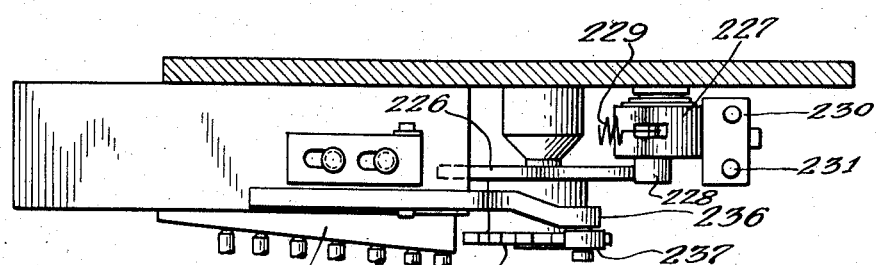
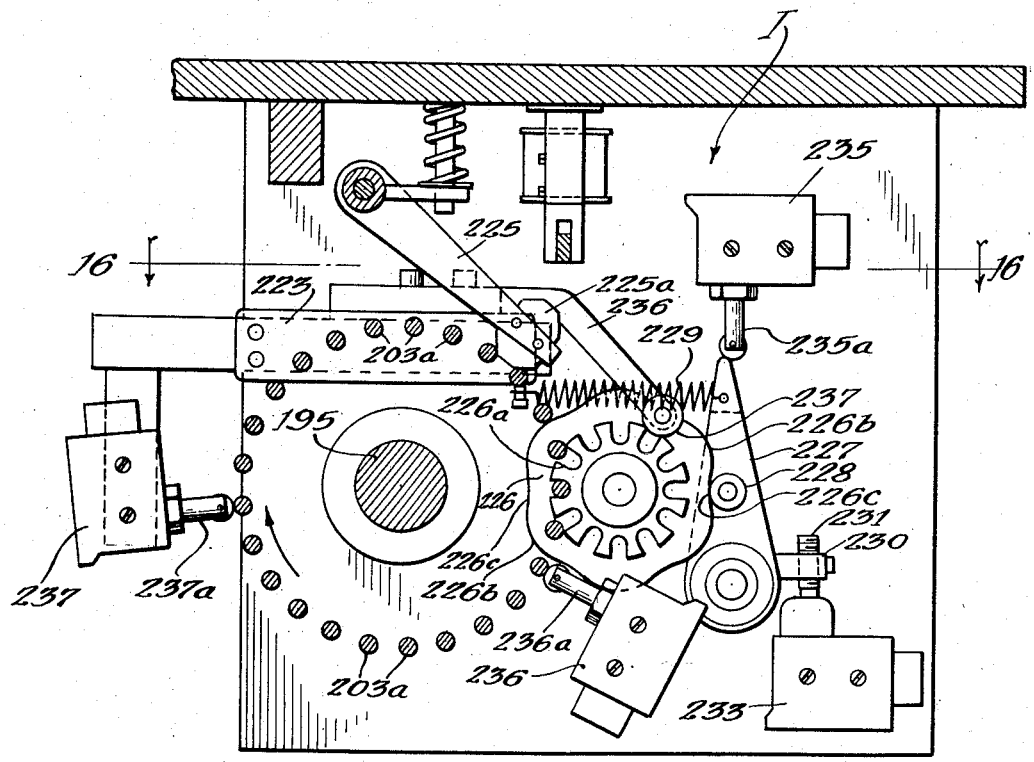
Inventors,
OTHO KILE,
ERNEST J. SARRING
By: Schroeder, Hofgren,
Brady & Wegner
Attorneys

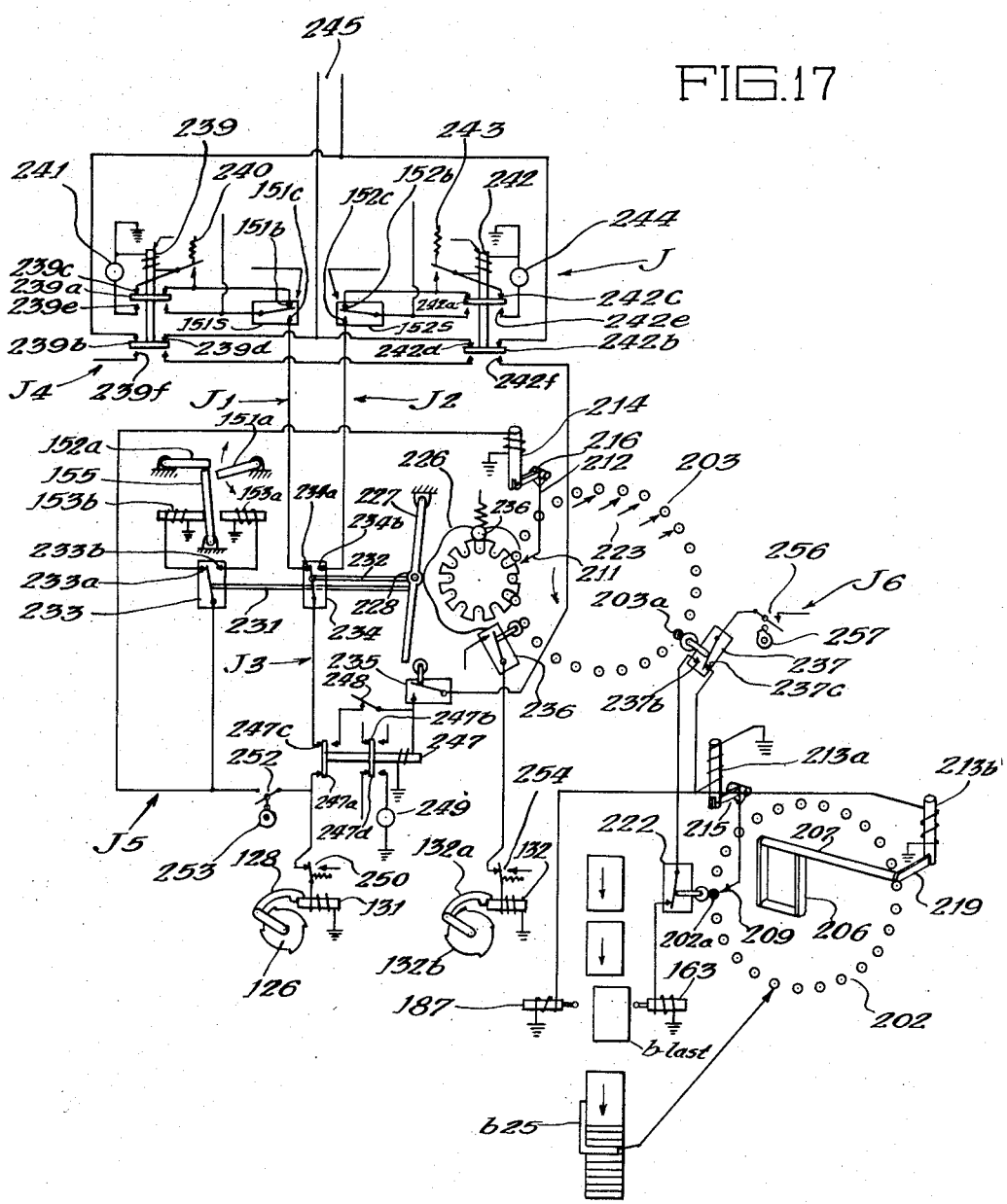

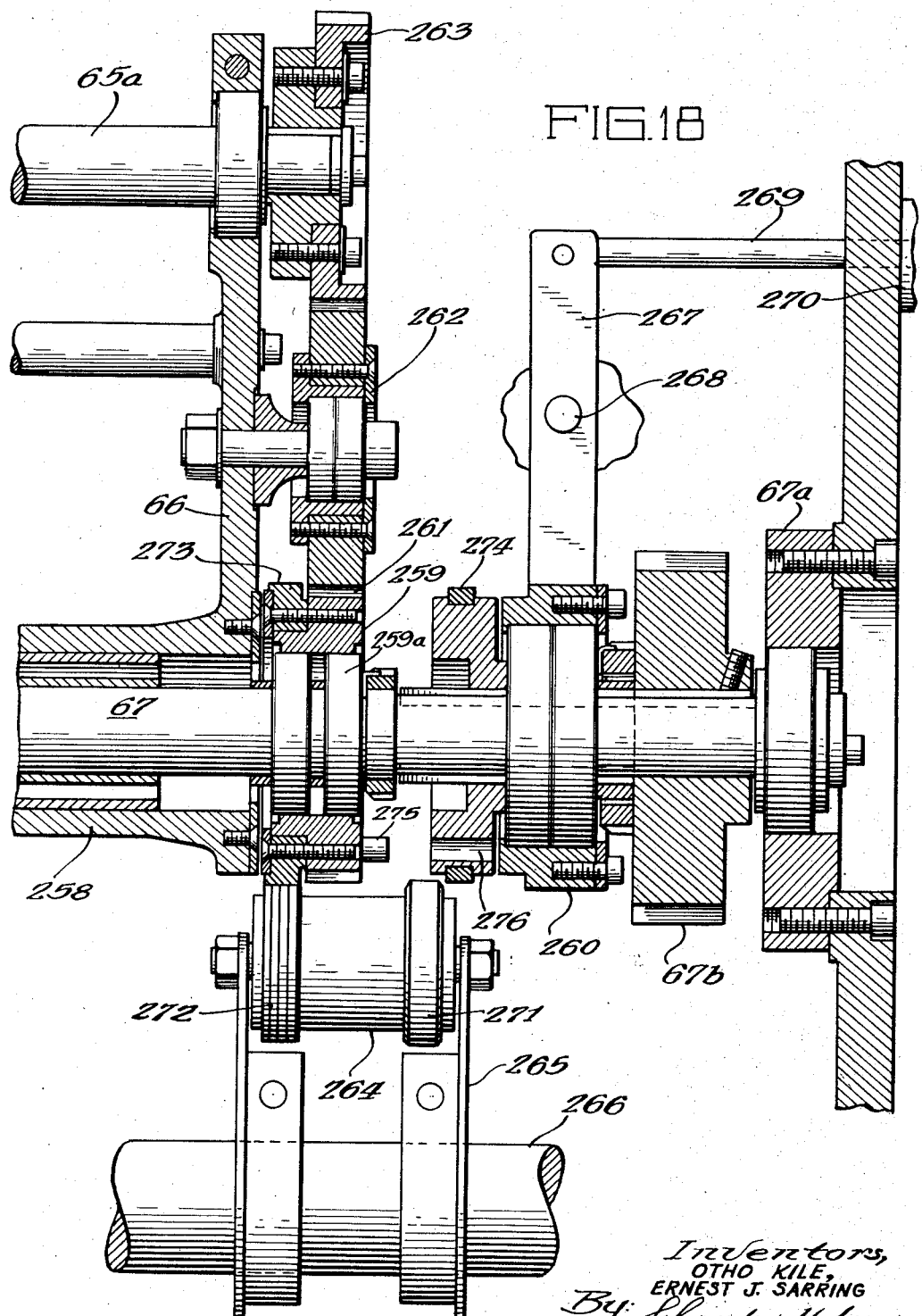

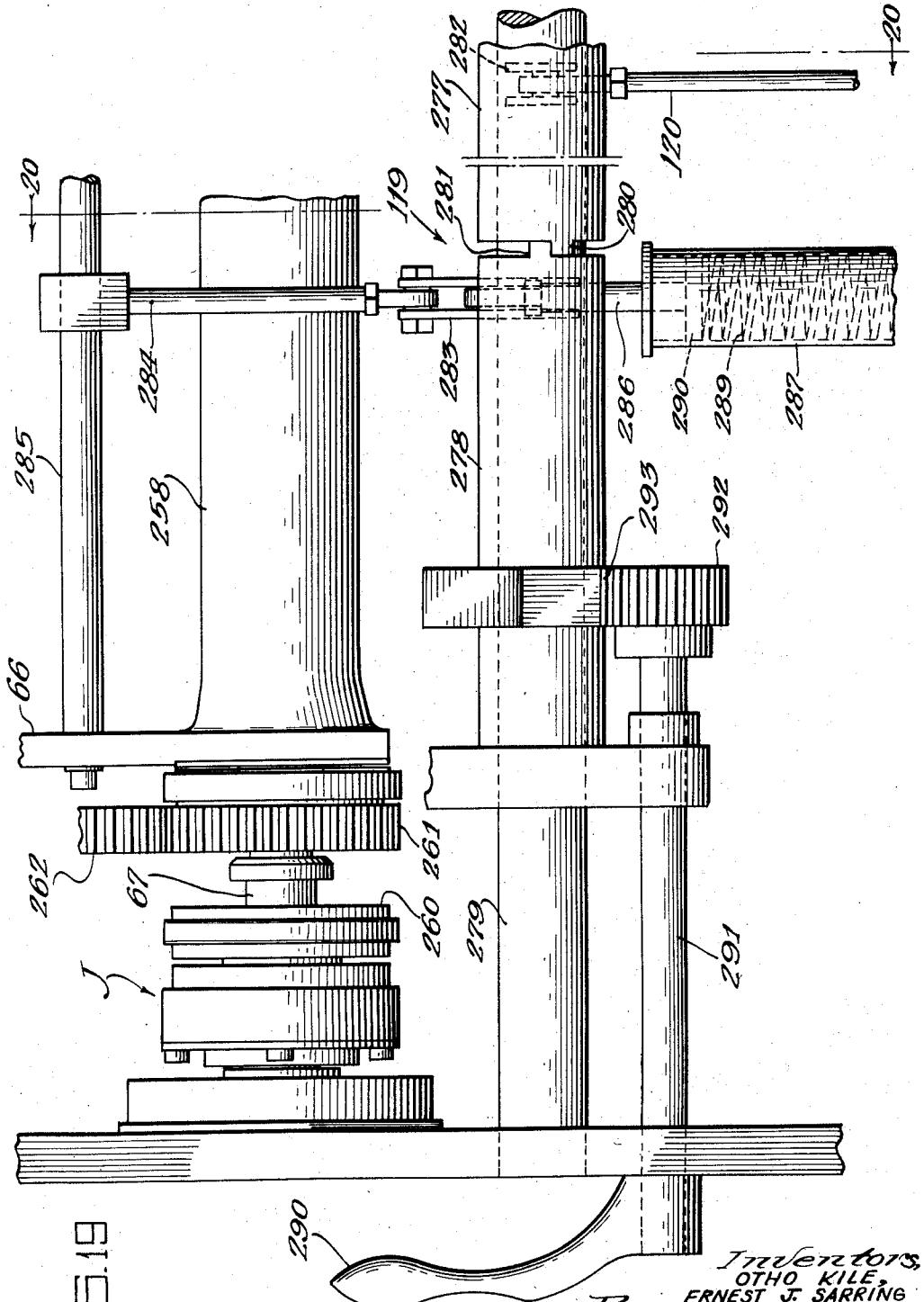

July 28, 1959  O. KILE ET AL  2,896,537
IMPRINTING MACHINE
Original Filed Aug. 23, 1954  14 Sheets-Sheet 14

Inventors,
OTHO KILE,
ERNEST J. SARRING
By Schroeder, Hofgren,
Brady & Wegner
Attorneys _United States Patent Office_

2,896,537
Patented July 28, 1959

2,896,537

IMPRINTING MACHINE

Otho Kile, Homewood, Ill., and Ernest J. Sarring, Easton, Pa., assignors to R. R. Donnelley & Sons Company, a corporation of Delaware Continuation of application Serial No. 451,502, August 23, 1954. This application June 12, 1958, Serial No. 741,701

34 Claims. (Cl. 101—231)

This invention relates to an imprinting machine for placing different imprints on successive groups containing different quantities of books in connection with the printing and binding of a large run of books.

It is a common practice for a company which distributes a specialty catalog, or the like, to distribute desired quantities to different dealers which have the dealer's name and address on the front cover, and perhaps a specialized dealer advertising message on the back cover. This imprinting of catalogs or other books presents a serious problem to a printer, because the numbers of imprints for various dealers differ, and some of the dealer imprint runs may be very short—for example, only ten or twelve catalogs. Thus, a run of catalogs totalling upwards of a million books may be broken down into numerous lots of varying sizes for the purpose of being imprinted.

As long as a single imprint contains more than about ten thousand units, it is practical to set up a rotary press and print the cover with the dealer's imprint on it; but it is uneconomical to handle imprinting of quantities smaller than about ten thousand on a rotary press. Accordingly, it has heretofore been customary to handle the imprinting on a job-shop basis. A company set up to handle large quantity printing may have a separate division organized to handle printing on a job basis, or may send the imprinting work out to a separate job shop.

The present machine takes catalogs or other books from a saddle stitcher and trimmer, and is arranged to imprint successively and continuously any desired number from about ten up to nine thousand, nine hundred and ninety-nine of any one imprint, and can shift automatically from one imprint to the next succeeding imprint without stopping and without missing a book.

The imprinting machine here disclosed receives books seriatim from a saddle stitcher and trimmer and carries them over a pair of rotating imprinting cylinders for imprinting the front and the back covers of the books. Associated with each imprinting cylinder are two movable imprinting rollers which are so adjusted and coordinated that either may print in the same identical space on the front or back cover of a book, as the case may be. Each imprinting roller is adapted to receive a rubber printing plate suitable for use with a quick drying ink. Each imprinting roller has an imprinting position and an idle position, and only one imprinting roller associated with each cylinder is in imprinting position at any given time. Both rollers ordinarily rotate at all times, but the idle roller may be manually stopped by disengaging a synchronous clutch, and may be manually swung out to a position where the printing plate may be readily changed. Thus, the new imprinting plate for a succeeding imprint may be set up on the idle imprinting roller while the other roller is working. The idle roller may then be swung back and the synchronous clutch re-engaged to start operating it in synchronization with the working roller.

The positions of the two imprinting rollers for each of the imprinting drums are controlled by a pair of preselected counters of the type which may be preset to any desired number, and when placed into operation will count up to the preselected number and then close an electric circuit to actuate any desired mechanism. The counters count the books entering the imprinting machine, and are adapted to reverse the positions of the imprinting rollers through a suitable set of electrical and mechanical controls when the preselected count closes the control circuit.

At any given time one counter is a control counter and the other counter is an idle counter. A preselected count may be set up on the idle counter while the control counter is operating, and at the end of the imprinting run which is then being made, the operation of the control counter not only switches the imprinting rollers, but also changes the actuator for the counters so that the idle counter starts being actuated and is thus a control counter, and the counter which has been working becomes idle.

The imprinted books are delivered in shingled relationship to a packing table; and in order that the packers may keep track of the individual imprint runs, and the number of books within a run, a deflector mechanism is provided at the outfeed end of the machine which kicks one end of every twenty-fifth book in any given imprint run to the right, and the last book in any imprint run to the left. Thus, the packers may readily pick up the books in packages of twenty-five for shipping; and know from the arrangement of the books when the end of a particular dealer imprint run has been reached. Suitable controls are operated at the end of an imprinting run, by the action of the preselected control counter, to kick the last book to the left to indicate the end of the dealer run, cancel the pin on a twenty-five count memory wheel which actuates the deflector to offset the twenty-fifth book in each run, and set a new pin so that the twenty-five count starts with book number one of the next beginning run.

The invention is illustrated in a preferred embodiment in the accompanying drawings, in which:

Fig. 3 is a generally schematic sectional view of the delivery end of the machine, parts being omitted for clarity;

Fig. 4 is a fragmentary transverse section taken generally as indicated along the line 4—4 of Fig. 2, showing the control cam mechanism for moving the imprinting rollers;

Fig. 5 is a section taken as indicated along the line 5—5 of Fig. 4, with certain parts omitted for clarity.

Fig. 6 is a section taken as indicated along the line 6—6 of Fig. 4, with certain parts omitted for clarity;

Fig. 7 is a fragmentary section on an enlarged scale taken generally as indicated along the line 7—7 of Fig. 1, showing parts of the two book lines, and the counter actuating mechanism;

Fig. 8 is a fragmentary side elevation, partly in section, viewing Fig. 7 from the right;

Fig. 9 is a fragmentary section taken as indicated along the line 9—9 of Fig. 8;

Fig. 10 is a fragmentary sectional view of the book deflector mechanism at the outfeed end of the machine;

Fig. 11 is a fragmentary section with parts broken away, taken as indicated along the line 11—11 of Fig. 10;

Fig. 12 is a fragmentary section taken substantially as indicated along the line 12—12 of Fig. 3, showing the memory control for the book deflector mechanism;

Fig. 13 is a fragmentary section with parts broken away, taken as indicated along the line 13—13 of Fig. 12;

Fig. 14 is a fragmentary section, taken as indicated along the line 14—14 of Fig. 13;

Fig. 15 is a fragmentary section taken as indicated along the line 15—15 of Fig. 12;

Fig. 16 is a fragmentary section with parts broken away, taken as indicated along the line 16—16 of Fig. 15;

Fig. 17 is a pictorial diagram of the control mechanism and the control circuits;

Fig. 18 is a fragmentary section taken as indicated along the line 18—18 of Fig. 2;

Fig. 19 is a fragmentary side elevational view of an imprint roller drive and manual throwout assembly, taken at the opposite side of the machine from Fig. 18, so that it is the mechanism for the other book stream from that handled by the mechanism shown in Fig. 18.

I. The imprinting machine generally

Books delivered from a saddle stitcher ordinarily pass through a trimmer from which they come out stacked in pairs, so that it is necessary to unstack the pairs of books to get them into order to be run seriatim through the imprinting machine. This operation is performed by an unstacker mechanism, indicated generally at A in Fig. 1, only the general operation of which will be described herein. The unstacker mechanism A is described in detail and claimed in applicant's copending application, Serial No. 451,503, filed August 23, 1954; issued October 25, 1955, as Patent 2,721,644.

Furthermore, the saddle stitcher usually delivers two identical streams of books which move side by side; so the imprinting machine of the present invention is set up to handle two streams of books side by side. Since the operation of both sides of the machines is the same, the detailed description will be directed to the mechanism for handling a single stream, it being understood that the elements are duplicated on two sides of the machine.

From the unstacker A, the books are carried seriatim on suitable conveyor mechanism B to a front imprinting unit C, thence to a back imprinting unit D, and thence to a delivery mechanism, indicated generally at E, seen in Fig. 3.

The position and operation of the imprinting rollers is controlled by means of imprinting roller cam mechanism F (Figs. 4, 5, and 6) which operates through suitable linkages; while overall control of the machine, including actuation of the cam mechanism F at the end of each imprint run, is obtained through predetermined counters and counter actuating mechanism G, illustrated in Figs. 7, 8, and 9.

A book deflector mechanism H, for offsetting the books either to the right or to the left, as circumstances may require, is illustrated in Figs. 10 and 11. Control of the deflector mechanism H is accomplished through memory control mechanism I, illustrated generally in Figs. 12 to 16, and the operation of which is shown in the pictorial diagram, Fig. 17, which also shows the operating control circuit J.

Figure 20:
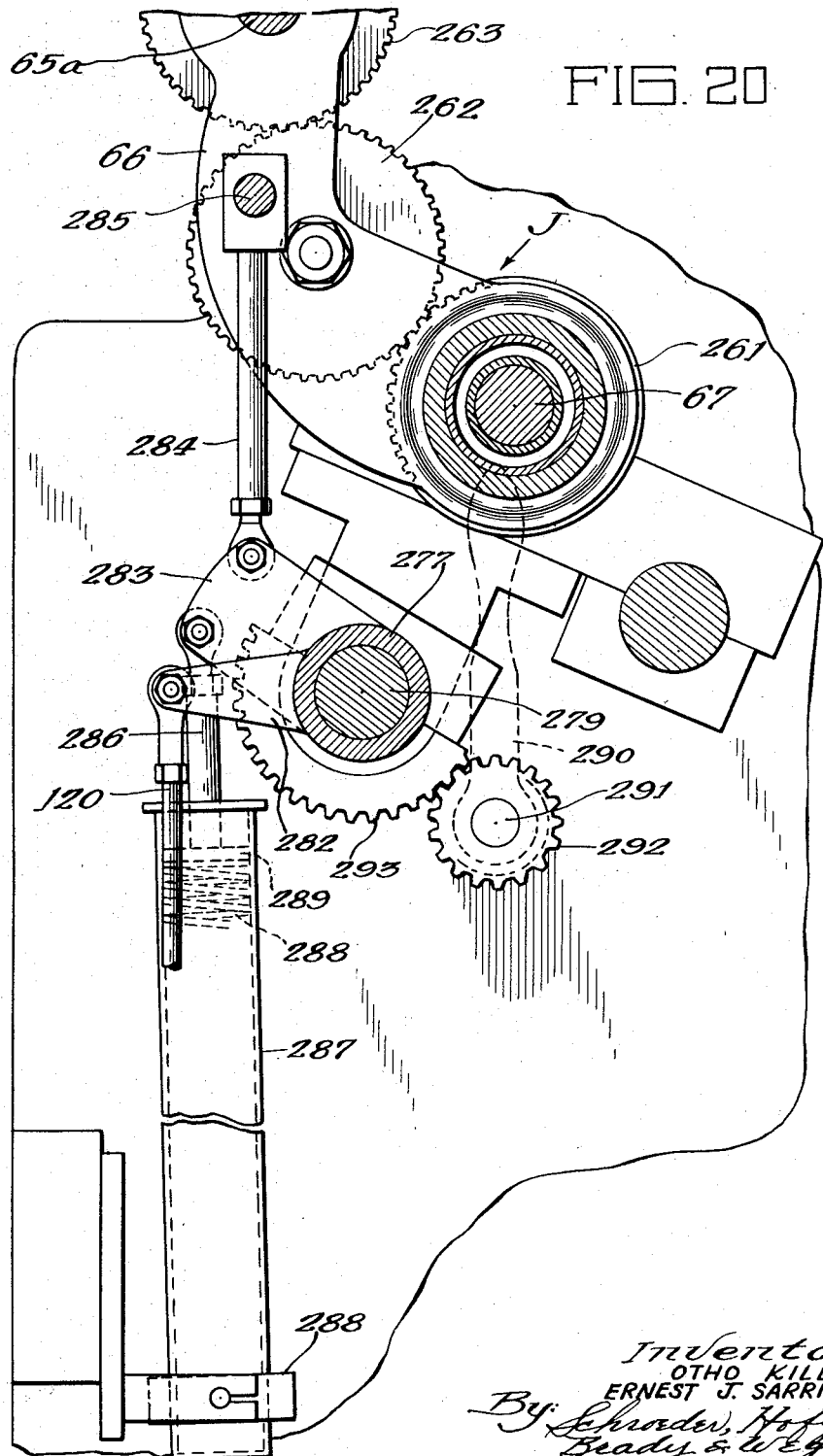
Fig. 20 is a section taken as indicated along the line 20—20 of Fig. 19.

Manual stopping of the imprinting rollers, and manual movement of the imprinting rollers to a "throwout" position for changing plates, is accomplished by manual control mechanism K, seen in Figs. 18 to 20.

II. Unstacker and conveyor

Figure 1:
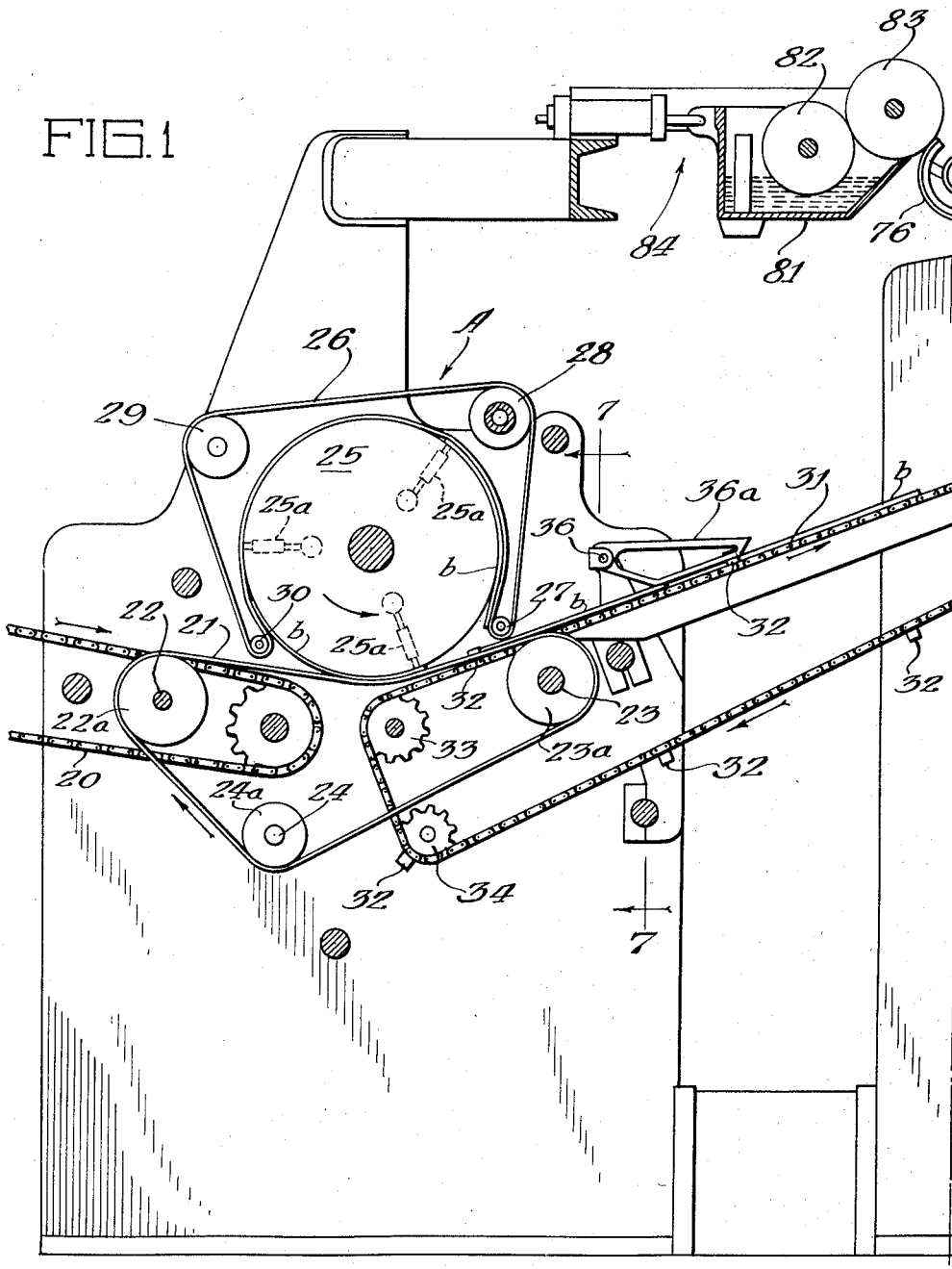
Fig. 1 is a generally schematic sectional view of the infeed end of the imprinting machine, parts being omitted for clarity.
Figure 2:
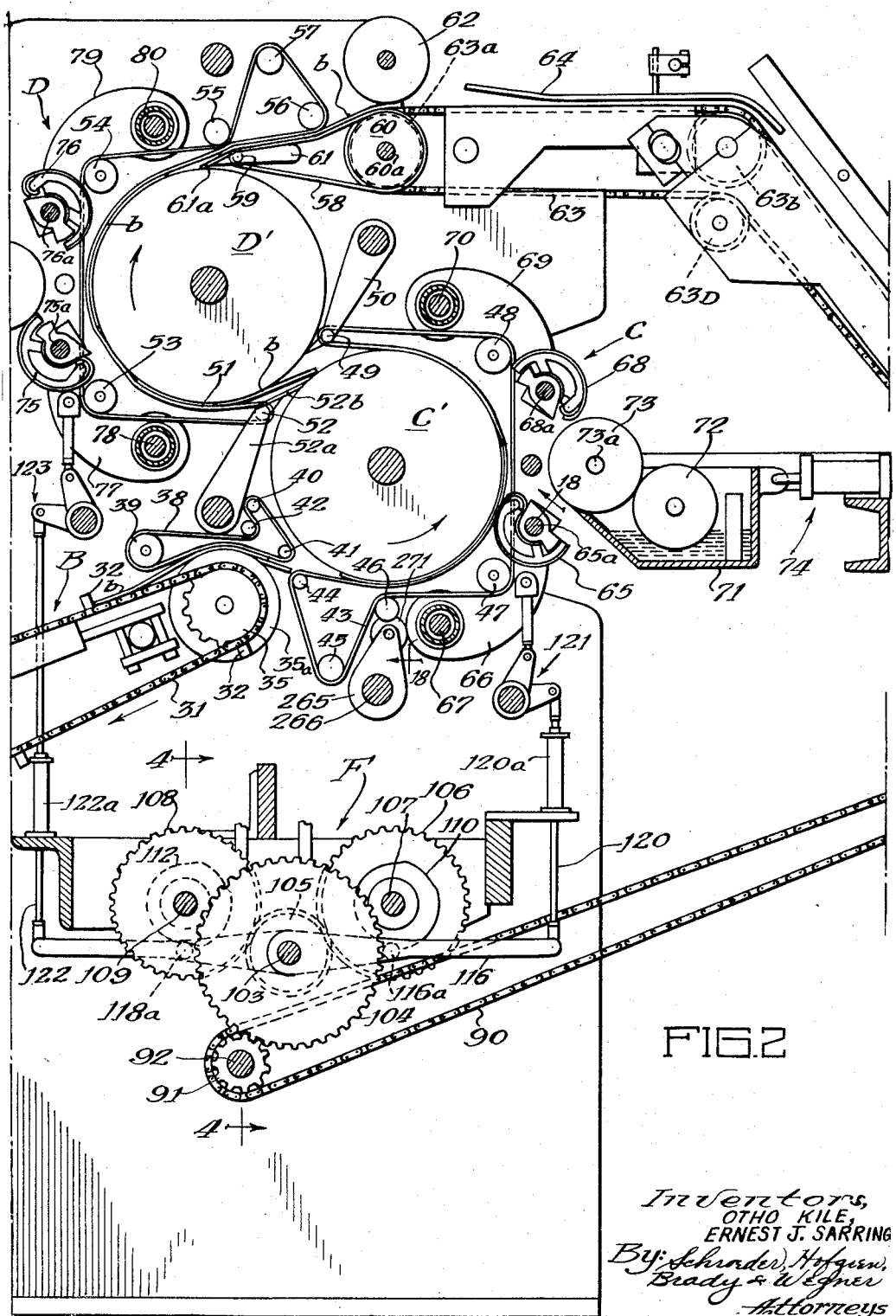
Fig. 2 is a generally schematic sectional view of the imprinting portion of the machine, parts being omitted for clarity.

Referring to the drawings in greater detail, and referring first to Figs. 1 to 3, books $b$ coming in stacks of two from a trimmer are delivered on a conveyor chain 20 (Fig. 1) to an unstacker belt 21 which is driven over suitable pulleys 22a, 23a, and 24a on shafts 22, 23, and 24 respectively, the shaft 23 being driven by appropriate mechanism. There is a space the size of a book between each two stacks of two books, and the spaced stacks pass under a driven unstacker drum 25 which has suitable suction tubes 25a to pick up the top book of the pair and feed it between the unstacker drum 25 and an unstacker belt 26 which runs on suitable rollers 27, 28, 29, and 30 so that it travels over the surface of the drum 25. The top book of a pair travels around the unstacker drum under the unstacker belt 26 and is dropped into the empty space on the belt 21 behind the next book following the book from which it was separated. From the unstacker, the books are delivered seriatim onto an infeed conveyor chain 31 which is provided with suitably spaced lugs 32 to keep the books in their proper positions with respect to one another. The infeed conveyor chain 31 is carried on suitable sprockets 33 and 34, seen in Fig. 1 and a sprocket 35 seen in Fig. 2, and the chain is driven in the usual manner. As the books start up the conveyor chain 31, they pass under a counter lockout rider finger 36a on a rock shaft 36 which will be described in detail in connection with the counter mechanism G.

From the conveyor 31, the conveyor mechanism B carries the books seriatim into a front imprint cylinder feeder which includes a roller 35a coaxial with the sprocket 35, and a feed belt 38 which is carried on rollers 39, 40, and 41 and tensioned by a roller 42. The infeed drum 35a and belt 38 deliver the books seriatim to a front imprinting belt 43 which extends more than half way around the front imprinting cylinder C' and is carried on suitable rollers 44, 45, 46, 47, 48, and 49. The roller 44 is immediately adjacent the inner end of the infeed belt 38, while the roller 49 is close to the surface of the back imprinting cylinder D'. The roller 49 is mounted on a pivoted arm 50 so that it may be adjusted to tension the belt. While the front imprinting belt is described as though it were a single piece, actually it consists of spaced, parallel webs, as is customary in printing apparatus, so that the imprinting rollers may contact the surfaces of the books between the webs. The same is true of all the imprinting belts.

From the front imprinting cylinder C' and the front imprinting belt 43 the books are delivered to a back imprinting belt 51 which is carried on suitable rollers 52, 53, 54, 55, 56, and 57 so as to extend about half way around the back imprinting cylinder D'. The roller 52 is carried on an adjustable arm 52a which has a book deflector plate 52b extending toward the front imprinting cylinder C', so that books traveling around the front cylinder C' will be deflected into the space between the back imprinting belt 51 and the back imprinting cylinder D'.

Books passing off the back imprinting cylinder D' are delivered by the back imprinting belt 51 to an outfeed belt 58 carried on rollers 59 and 60, the roller 60 being on a driven shaft 60a and the roller 59 being on a suitable arm 61 which is provided with a deflector finger 61a to take the book off of the cylinder D' and move it into the space between the back imprinting belt 51 and the outfeed belt 58. The books on the belt 58 pass under an outfeed drum 62 and thence to an outfeed conveyor chain 63 which is part of the outfeed mechanism E. The conveyor chain 63 is trained over a drive sprocket 63a on the shaft 60a, and idler sprockets 63b, 63c, and 63d. Lugs on the conveyor chain 63 keep the books properly spaced. Where the chain 63 changes direction at the sprocket 63b is a deflector plate 64 to guide the books around the corner.

III. Imprinting mechanism

Turning now to the front imprinting mechanism C and back imprinting mechanism D, as seen in Fig. 2, the front imprinting mechanism C has a lower imprinting roller 65 mounted on a shaft 65a between rocker arms 66 which are supported on a shaft 67 for swinging movement and an upper imprinting roller 68 which is mounted on a shaft 68a between rocker arms 69 on a shaft 70 for swinging movement. As seen in the drawing, the lower imprinting roller 65 is in imprinting position, while the upper imprinting roller 68 is in idle position. As seen in Fig. 18, the drive for the imprinting roller 65 is through a gear train from the shaft 67, as will be described in detail in connection with the manual control mechanism K. A similar gear train drives each imprinting roller. An ink fountain 71 for the imprinting rollers 65 and 68 is provided with the usual driven inking rollers 72 and 73 for inking the imprinting rollers 65 and 68. It will be noted that the axis 73a of the inking roller 73 is exactly intermediate between the axes 65a and 68a of the imprinting rollers 65 and 68 respectively. This permits the idle imprinting roller 68 to move first to a position in which it contacts only the inking roller 73 without contacting the books passing over the imprinting cylinder C', and thereafter to move to an imprinting position in which it contacts both the inking roller 73 and the books passing over the cylinder C'. This permits the idle imprinting roller 68 to be inked for two or three cycles; i.e., imprinting operations while the roller 65 is still in imprinting position and then when the final change of imprint rollers takes place the imprint roller 68 is already inked so that there are no books spoiled by reason of a weak or illegible first impression. The mechanism by which this is accomplished will be described in more detail in connection with the roller cam mechanism F.

The ink fountain 71, which carries with it the inking rollers 72 and 73, may be longitudinally retracted a short distance by means of an air cylinder mechanism 74 to remove the inking roller 73 from contact with the imprinting roller 65. This is so that if the imprinting machine is stopped because of improper feeding of books, or the like, the inking rollers 72 and 73 may be turned slowly to keep them wet until the machine is put back into operation, at which time the air cylinder 74 returns the ink fountain 71 to its normal position. During such a period of shutdown, the inking rollers 72 and 73 are driven at slow speed through an overrunning clutch mechanism by a separate auxiliary motor. In view of the fact that such continuous operation of the inking rollers, and retraction of the ink fountain, are common practice in the use of rotary presses with quick drying ink, the mechanism by which this is accomplished will not be described in detail.

Like the front imprinting mechanism C, the back imprinting mechanism D is also provided with a lower and an upper imprinting roller, designated as 75 and 76, respectively, the lower roller 75 being on a shaft 75a on rocker arms 77 pivoted on a shaft 78, while the upper roller 76 is on a shaft 76a on rocker arms 79 pivoted on a shaft 80. Likewise, as seen in Fig. 1, the imprinting mechanism D has an ink fountain 81 provided with inking rollers 82 and 83, and the ink fountain 81 may be retracted by means of an air cylinder 84 in a manner similar to that described for the ink fountain 71 of the imprinting mechanism C.

In view of the fact that the basic driving mechanism for the feed belts, conveyor chains, imprinting cylinders, imprinting rollers and inking rollers is perfectly well known to those skilled in the art of building printing equipment, such driving mechanism, and its connection with the rotatably driven elements of the present machine will not be described in detail. Likewise, the overall control for the unit includes conventional start and stop buttons which control starting and stopping of the drive mechanism by means of a combined magnetic clutch and brake unit, of a type commonly used in rotary press construction; so the basic controls are familiar to those skilled in the art.

IV. *Outfeed and book delivery*

Referring to Fig. 3, adjacent the outfeed conveyor chain 63 of the outfeed mechanism E is a book counter lockout mechanism, indicated generally at 85, which will be described in more detail in connection with the book deflector mechanism I and the memory control mechanism J.

When the books reach the bottom of the chain 63 they drop onto a rotating delivery belt 86 which runs on an idler roller 87 and a driven roller 88a on a shaft 88 which is connected through a sprocket 89 and chain 90 to a sprocket 91 on a drive shaft 92 which also drives the cam control mechanism F for the imprinting rollers as will be described in connection with said cam control. An idler sprocket 93 serves to tension the chain 90. The delivery belt 87 carries each book under a delivery roller 94 and drops it onto a conveyor delivery chain 95 which runs on a sprocket 96 and a second sprocket (not shown), and which forms part of a delivery table, indicated generally at 97. An adjustable arm 98 is pivoted above the delivery chain 95, and has mounted at its outer end a roller 99 against which books carried on the delivery chain 95 pile up so that they pass under the roller 99 in shingled relationship as shown in Fig. 3.

As the books pass off the outfeed conveyor chain 63 they are positioned where they may be acted upon by the book deflector mechanism H, which will be described in detail hereafter. The deflector mechanism H is for the purpose of permitting the packers who work at the delivery table 97 to keep track of the number of books delivered. Beginning with the first book of any given imprint, every twenty-fifth book is struck by a deflector arm which deflects its forward portion to the right, so that the packers may pick up the books in bundles of twenty-five for shipping without having to count them. The deflector arm deflects the front of the last book in an imprint run to the left so that the packers know when they have reached the end of a group of books to be delivered to one dealer. The offsetting operation, either to the right or to the left, is controlled by the memory control mechanism indicated generally at I, which will be described in detail also in connection with the deflector mechanism H.

V. *Cam control mechanism for imprinting rollers*

Referring now to Figs. 4, 5, and 6 which illustrate the roller cam mechanism F for controlling movement of the imprinting rollers between imprinting and idle position, the drive shaft 92 upon which is the sprocket 91 for the drive chain 90 which drives the delivery belt 86 is provided with a large sprocket 100 to receive a main drive chain 101, and a pair of pinions 102 which drive the cam control mechanism F, for the right and left-hand book trains. Since the operation of the control for both book trains is identical, only one set of the controls shown in Fig. 4 will be described in detail. The line of division between the two sets of controls is indicated at Z in Fig. 4.

The pinion 102 drives an intermediate shaft 103 through an intermediate shaft gear 104, and journalled on the intermediate shaft 103 are sleeves 103a and 103b upon which are keyed gears 105a and 105b respectively. The gear 105a meshes with a cam shaft gear 106 on a cam shaft 107, while the gear 105b meshes with a cam shaft gear 108 on a cam shaft 109 (see Fig. 6). Mounted on the cam shaft 107 is a pair of cams 110 and 111 for controlling the front lower and the front upper imprinting rollers 65 and 68, respectively; while the shaft 109 is provided with cams 112 and 113 for controlling the back lower and upper imprinting rollers 75 and 76 respectively.

Also mounted on the intermediate shaft 103 is a cam follower sleeve 114 on which are pivoted bifurcated cam follower arms 116 and 118 for the cams 110 and 112, and a cam follower sleeve 115 on which are pivoted follower arms 117 and 119 for the cams 111 and 113. As best seen in Fig. 5, the bifurcated cam follower arms 116 and 118 are provided with cross members 116a and 118a which serve as cam contacting members which ride on the surfaces of the cams 110 and 112 respectively. The cam follower arms 117 and 119 have similar cross members (see 119a in Fig. 4) which ride on the cams 111 and 113 respectively.

The cam 110 and cam follower arm 116 cooperate to control the movement of the lower front imprinting roller 65 between imprinting position and idle position, being linked to the rocker arm 66 for said imprinting roller by means of an actuating rod 120 which extends through a rod guide 120a on a suitable frame member to a linkage, indicated generally at 121 (see Fig. 2), which connects the actuating rod to the rocker arm. Similarly, the cam 112 and the cam arm 118 operate through an actuating rod 122 which extends through a suitable rod guide 122a and is connected to a suitable linkage 123 by means of which the rod 122 is linked to the rocker arm 77 for the lower back imprinting roller 75.

Similar actuating rods connect the cam follower arms 117 and 119 through suitable linkages with the rocker arms 69 and 79 for the front and back upper imprinting rollers 68 and 76, respectively. The rods and linkages for positioning the upper imprinting rollers are not shown, but the linkages are appropriately organized to move the rocker arms 69 and 79 up to the idle position and down to imprinting position—the reverse of the motion of the rocker arms 66 and 67 for the lower rollers.

The linkage 121 through which the actuating rod 120 is connected to the rocker arm 66 is also a part of the manual control K for swinging the lower front imprinting roller 65 out for the purpose of changing imprinting plates, and will be described in detail in connection with the manual mechanism K.

At the end of an imprinting run, each of the cam shafts 107 and 109, which are ordinarily stationary, is rotated one-half turn to switch the imprinting rollers between their imprinting and their idle positions. Since the one-half revolution of the cam shaft 107 must move the front imprinting rollers 65 and 68 in opposite directions, the cams 110 and 111 are set approximately 180° out of phase; and similarly the cams 112 and 113 on the cam shaft 109 are about 180° out of phase. They are not precisely 180° out of phase because of the lag of about one-half a booklength between the area where a lower roller prints and that where an upper roller prints. To be timed properly, the upper rollers must move to imprinting position slightly after the lower rollers move to idle position, to permit a book which is imprinted by the lower roller to pass the upper roller without having the latter roller print on it. Conversely, the lower rollers must move to imprinting position slightly before the upper rollers move to idle position, so that the first book of a new imprinting run will be imprinted properly by the lower roller. This is accomplished by the relative angular disposition of the cams 110 and 111 and of the cams 112 and 113.

As seen in Fig. 5, the cam 110 has an idle lobe 110a, an inkling lobe 110b, and an imprinting lobe 110c; and the other cams 111, 112, and 113 have similar idle, inking and imprinting lobes; those on the cam 112 being also lettered a, b, and c, respectively. When any cam follower is on the idle lobe of a cam, the imprinting roller is in idling position, while movement of a cam follower onto the inking lobe moves the imprinting roller into an intermediate inking position where it is in contact with the inking rollers so as to be inked before being moved the remainder of the way to imprinting position by movement of the cam follower onto the imprinting lobe. Movement of the imprinting rollers to an intermediate inking position insures that the imprinting plate will be thoroughly wet with ink so that the first impression on a new imprinting run will be perfect.

The one-half revolution of each cam shaft to switch the positions of the imprinting rollers is caused by a single revolution clutch unit—that of the cam shaft 109 being indicated generally at 125 in Fig. 6.

The single revolution clutch unit 125 includes a four-tooth clutch 126 having notches 126a which is mounted on the intermediate shaft 103 so as to rotate at all times; while mounted on the sleeve 103b is an arm 127 which carries a single revolution clutch dog 128 having a lug 129 to engage any one of the four notches 126a of the four-tooth clutch 126. Since the clutch dog 128 is on the sleeve 103b, it is normally stationary and rotates only when the lub 129 is engaged with one of the notches 126a. The single revolution clutch dog 129 is constantly urged into engagement with the four-tooth clutch 126 by means of a tension spring 130 and is normally held out of engagement by a solenoid 131 which is mounted above the shaft 103 on a suitable frame member. Connected to the solenoid plunger 131a is a suitable clutch dog control linkage indicated generally at 133 which normally holds the clutch dog 128 out of engagement with the four-tooth clutch 126.

As best seen in Fig. 4, the linkage 133 consists of a cam bell crank 134 which is pivoted at 135 on the frame member which supports the solenoid 131, the bell crank having a cam surface 134a on which the clutch dog 128 normally rests, and a tension spring 136. Actuation of the solenoid 131 draws up the solenoid plunger 131a which acts through a chain link 137 to pivot the bell crank 134 laterally as seen in Fig. 4 and release the clutch dog 128 for movement by the spring 130 into engagement with a notch 126a of the four-tooth clutch 126. The solenoid 131 is actuated only momentarily after which the spring 136 is free to return the bell crank 134 so that as the clutch dog 128 completes its one revolution, its cam follower 128a returns to position on the cam 134a and disengages the lug 129 from the four-tooth clutch.

The solenoid 131 is under control of the counter actuator mechanism G and is actuated only at the end of an imprinting operation when one of the predetermined counters in the counter mechanism G completes its preselected count and acts to terminate an imprinting run and start a new imprinting run. A solenoid 132 (see Fig. 4) controls the dog 132a of a single revolution clutch 132b (see Figs. 4 and 17) for the cam shaft 109 which moves the back imprinting rollers 75 and 76 and this solenoid is actuated three cycles after the solenoid 131 for the front rollers. This is because there is a time lag between the front imprinting operation performed by mechanism C and the back imprinting operation performed by mechanism D. The imprinting rollers change position only at the end of an imprint run and in every case, the front imprint and the back imprint must coincide through any given run. Considering a single imprinting operation on a single book as one cycle, the back imprinting rollers print three cycles behind their respective front imprinting rollers. This is handled by the memory control mechanism I in a manner which will be described in detail in connection with that mechanism.

The book count to actuate the counters of the system G is taken four cycles ahead of the front lower imprinting roller 65 so that there must be a lag of four cycles between the impulse at the end of an imprinting run caused by the preselected counter reaching the end of its count and the operation of the control cam through one-half revolution to reverse the positions of the imprinting rollers. This is accomplished by suitable gear ratios between the pinion 102 on the drive shaft 92, the intermediate gear 104 on the intermediate shaft 103, the gears 105a and 105b on the sleeves 103a and 103b, and the gears 106 and 108 on the cam shafts 107 and 109. The shaft 92 makes one revolution per cycle, the gear ratio between the shaft 92 and the shaft 103 is 4:1, while the gear ratio between the sleeves 103a and b and the cam shafts 107 and 109 is 2:1. Thus, every four revolutions of the drive shaft 92 produces one-half revolution of either of the cam shafts. This, in combination with the proportion between the idle, inking and imprinting lobes of the control cams provides the necessary lag between the impulse to the solenoid 131 and the actual switching of the imprinting rollers.

The entire mechanism for reversing the positions of the imprinting rollers is believed to be clear from the foregoing description. When a control counter in the system G reaches the end of a preselected count, it activates the solenoid 131 to release the dog clutch 128 so that the latter is pulled into engagement with the four-tooth clutch 126 by means of the tension spring 130. The clutch dog 128 makes one revolution with the four-tooth clutch 126, thus causing the pinion 105a on the sleeve 103a to drive the cam shaft 107 one-half revolution. The clutch dog is disengaged at the end of one revolution to stop the movement of the cam. The one-half revolution of the cam carries the imprint rollers which have been in idle position first into contact with their respective inking rollers so that the imprint rollers are inked for two cycles before they move on to their imprinting positions, in synchronization with the movement of the imprinting rollers which have been active to their idle position.

VI. Counter and counter actuator mechanism

Referring now to Figs. 7, 8, and 9; the counter and counter actuator mechanism G is mounted on a suitable bracket 138 and includes a control cam 139 mounted on the shaft 23 which drives the unstacker feed belt 21. The counter mechanism for both book streams is in one counter unit. Mounted on a stay shaft 140 are two rocker arms 141 and 142 which are provided with cam followers 143 and 144 respectively, which ride on the control cam 139. The rocker arm 141 actuates the counters for one book stream while the rocker arm 142 actuates the counters for the other book stream.

Referring to Fig. 8, a counter push rod 145 is pivoted to the rocker arm 141 at 141a, while a push rod 146 is similarly pivoted to the rocker arm 142. The push rod 145 extends through a guide member 147 beneath the bracket 138 and is provided with a follower spring 145a which is positioned between the guide member and a spring stop 145b. The push rod 146 extends through the guide 147 and through a second guide 148 adjacent which it is provided with a follower spring 146a and spring stop 146b.

A counter 149 has an actuating finger 149a which is adapted to be actuated by an actuator ring 145c on the push rod 145 and a second counter is represented by its counter actuating finger 150a which is adapted to be actuated by the spring stop 145b. A counter 151 having a finger 151a and a second counter represented by its actuating finger 152a are positioned for actuation, respectively, by an actuator ring 146c and by the spring stop 146b on the push rod 146. The counters 149 and 150 control operation of one book stream while the counters 151 and 152 control the other book stream.

The cam 139 is so timed that the push rods 145 and 146 reciprocate to actuate the counters once for each cycle in the machine operation so as to count the number of books entering the machine. To take care of the absence of defective books which may be removed before they reach the imprinter or incomplete or inconsecutive deliveries by the saddle stitcher or trimmer, a counter lockout mechanism is provided which was alluded to briefly in connection with the travel of the book streams from the unstacker into the imprinting machine proper. On the counter lockout rod 36 is the counter lockout rider finger 36a for one book stream, while for the other book stream there is a tubular shaft 37 surrounding the rod 36 which has a lockout rider finger 37a. The tubular shaft 37 terminates adjacent the top of the rocker arm 142 while the rod 36 terminates adjacent the top of the rocker arm 141, and the rod and the sleeve are provided, respectively, with lockout dogs 36b and 37b seen in Figs. 7 and 8. The lockout rider fingers 36a and 37a are supported on the respective book streams and if a book is missing from a stream, the finger drops into the gap dropping the corresponding lockout dog into a notch at the upper end of the adjacent rocker arm, thus holding the rocker arm back to prevent actuation of the counter until another book comes along.

Each push rod may actuate either of the counters associated with it, but may not operate both counters at once. The shift of the count from one counter to the other is accomplished by the mechanism shown in Fig. 9 which includes a two-way solenoid; the solenoid for the counter fingers 151a and 152a being designated as 153, while that for the counter fingers 149a and 150a is designated as 154 (Fig. 8). The solenoids are mounted upon the push rod guide brackets 147 and 148 and on each of the guide brackets is pivotally mounted a counter deactivator arm such as the arm 155 seen in Fig. 9. The counter deactivator arm 155 is linked to the plunger 153a of solenoid 153 and is provided with counter finger lockout elements 155a and 155b for the counter arms 151a and 152a, respectively. When the solenoid is in the position shown in Fig. 9, the finger for the counter 152a is locked out so that the counter cannot be actuated, while movement of the solenoid to its opposite position with the plunger 153a extended releases the counter finger 152a and locks out the counter finger 151a. The solenoid acts only momentarily so the deactivator arm 155 is provided with a pair of notches 155c and 155d to receive a spring pressed snap detent 156.

As previously mentioned, each of the four counters is of the predetermined type; that is, any preselected count may be set up on the counter, and when the counter has been actuated enough times to reach the preselected count, the counter has a suitable self-contained switch which may close an electric circuit. In the present device, the predetermined counters perform a number of operations at the end of an imprinting run and one of these operations is to activate the corresponding solenoid 153 or 154 so as to automatically shift the count from the counter which has been active to the counter which has been idle. Thus, at any given time, either the counter 149 or the counter 150 is a control counter while the other is an idle counter; and similarly with the counters 151 and 152. The circuits through which the counters perform their various operations will be described in detail in connection with Fig. 17 of the drawings, after all of the elements of the unit, the operation of which is dependent upon the counters, have been described.

VII. Book deflector mechanism

The book deflector mechanism H is illustrated in Figs. 10 and 11. A cam 157 is mounted on the shaft 88 which drives the delivery belt 86 so that it runs constantly and is adapted to rock a three fork cam follower 159 which is pivoted on a cross member at 160, contact between the cam and the cam follower being through a roller 159a. The cam follower 159 has a first arm 161 to deflect a book to the right and a second arm 162 to deflect a book to the left. The cam 157 and cam follower 159 operate to deflect a book only when appropriate linkages are engaged by the operation of solenoids which are under the control of the memory control mechanism I.

There are two solenoid controls and two sets of linkages for each book stream, there being a solenoid and a linkage for right deflection and another for left deflection of the books in each stream. Right deflection is accomplished for the right hand book stream by a solenoid 163 to the plunger 163a of which is attached a bell crank 164 which is mounted on a pivot at 165, the upper end of the bell crank 164 being adjacent the arm 161 of the cam follower. Mounted above the cam follower on a pivot 166 is a T lever 167 having a right hand deflection control arm 168a above the cam follower arm 161 on which is mounted a pivoted latch 169 having a latch hook 170 which is rocked into engagement with the cam follower arm when the bell crank 164 is swung by operation of the solenoid 163. Latch arm 169 is resiliently urged out of engagement with the cam follower arm 161 by means of a tension spring 171 which is hooked to the latch arm 169 and to a spring bracket adjacent the pivot 166. The T-shaped lever 167 has an upright arm 172 to which is secured a laterally projecting book deflector member 173 which extends beneath the left hand book stream. On the deflector member 173 is a pair of deflector brackets 174 and 175 which extend upwardly and flank the books travelling in the book stream on the left hand outfeed conveyor chain 63. When the solenoid 163 is activated to move the latch 169 into engagement with the constantly moving cam follower arm 161, it lifts the arm 168a of the T-shaped lever 167 and pushes the book deflector member 173 to the right, causing the deflector bracket 175 to slide the book then opposite it to the right. The T-shaped lever 167 is held in a neutral, upright position by a pair of opposed compression springs 183 and 184.

Left hand deflection of a book in the left hand book stream is accomplished by a solenoid 187 which is not visible in either Fig. 10 or Fig. 11, but which appears in Fig. 17, said solenoid acting through a bell crank (not shown), like the bell crank 164 to pivot a latch lever 185 on the other arm 168b of the T-shaped lever 167. The latch 185 is adapted to be engaged with the arm 162 of the cam follower 159 when its solenoid is actuated and this raises the arm 168b of the T-shaped lever 167 so as to pull the deflector 173 and cause the deflector bracket 174 to push a book to the left.

A second solenoid 176 (Fig. 11) acts through a bell crank 177 to operate a latch 178 which may be engaged with the constantly reciprocating cam follower arm 161, the latch 178 being on a T-shaped lever 179 which is similar to the lever 167 but which has a somewhat taller shank to which is attached a deflector member 180 provided with right and left deflector brackets 181 and 182 which flank the right hand book stream. Mechanism similar to the solenoid 187 and associated parts is provided for pushing a book in the right hand book stream to the left by means of the deflector member 180 and deflector bracket 181.

The solenoid 163 is actuated upon the positioning between the deflector brackets 174 and 175 of every twenty-fifth book in any given imprinting run so as to deflect every twenty-fifth book to the right. The solenoid 187 for left deflection of books in either stream (seen only in Fig. 17) is activated only at the end of an imprinting run. Thus, the packers working at the delivery table have an accurate count of the books in lots of twenty-five for packaging to ship and also know when the end of any particular dealer imprint run takes place.

VIII. Memory control mechanism

Since the memory control mechanism I, seen in Figs. 12 to 16 and in the operating diagram of Fig. 17, must operate in accordance with the number of books passing through the imprinting machine, its actuation is accomplished through a counter mechanism. As seen in Fig. 3, a memory control counter cam 187 mounted on a shaft 188 has three lobes 187a, 187b, and 187c, so that the counter cam may make a single revolution for three cycles of the machine. A rock shaft 189 adjacent the counter cam 187 carries a bell crank 190 which is provided with a cam roller 191 to ride on the counter cam 187. The bell crank 190 is urged into engagement with the cam 187 by means of a compression spring 192 which bears on the lower arm of the bell crank opposite that on which the roller 191 is mounted; and, on said lower arm is a ratchet dog 193 for rotating a memory mechanism drive ratchet 194 which is mounted on a shaft 195. Since the count for turning the ratchet 194 is taken off a moving part of the machine, it is necessary to have a counter lockout similar to that which is used in the counter actuating mechanism G. This lockout mechanism has already been shown generally as 85 in Fig. 3 and includes a book rider finger 196 which rides on the book stream carried on the outfeed conveyor chain 63; the rider finger 196 being connected by a tie rod 197 to a lever 198 which is secured to a rock shaft 199 on which a counter lockout latch 200 is keyed. Latch 200 is adapted to engage the upper end of a latch arm 201 secured to the rock shaft 189 for the bell crank 190. It is clear from the arrangement of the counter cam 187, bell crank 190 and compression spring 192, that the cam lobes 187a, b, and c swing the bell crank back withdrawing the ratchet pawl 193 from the teeth of the ratchet 194 and the compression spring 192 urges the bell crank back to its normal position as the cam roller 191 rides off of each lobe. The counter lockout arm 201 operates to hold the bell crank 190 in its retracted position when engaged by the latch 200 so that the force of the spring 192 cannot drive the bell crank arm over to engage the pawl 193 with the ratchet teeth. Thus, whenever there is a book missing from the outfeed stream, the book rider finger 196 acts through the linkage and latch 200 to lock back the bell crank 190.

Referring now to Figs. 12 to 16, the memory control mechanism I includes a twenty-five count memory pin wheel 202 on the back of the ratchet drive wheel 194 on the shaft 195 and an imprint change memory pin wheel 203 which is also mounted on the shaft 195. Each of the memory pin wheels 202 and 203 is provided with twenty-five pins such as the one shown in the sectioned portion of the wheel 203 in Fig. 12, designated 203a, which is shown in its "set" position in solid lines and in an "idle" position in broken lines. Each pin has two circumferential grooves 203b and 203c, either one of which may be engaged with a garter spring 204 which surrounds the wheel 203. Similarly, the pins 202a of the twenty-five count wheel 202 are engaged with a garter spring 205. Thus, any of the pins 202a or 203a may occupy a retracted position such as that shown in broken lines for the pin 203a, or a set position such as that shown in full lines for the pin 203a, and as shown by the location of the pin 202a.

Slidably mounted on the shaft 195 behind the twenty-five counter wheel 202 is a pin cancelling ring 206 which may be moved by a yoke 207. The mechanism shown in Figs. 12 to 16 is that for only one of the two book streams, and there is another identical mechanism on the other side of the shaft 195, to the left of Fig. 12. The units are mirror images of one another so that the twenty-five pin cancelling ring 206 and its counterpart in the other control unit may both be stabilized by a single compression spring 208.

The memory pins 202a in the wheel 202 are set by a screw plunger 209 in the lower end of a pivoted lever 210 while the pins 203a are set by a plunger 211 in a similar pivoted lever 212 and since the two plungers operate at different times the levers 210 and 212 are linked by a common return spring 212a. A twenty-five wheel solenoid 213 and an imprint change solenoid 214 have their plungers 213a and 214a connected, respectively, to rocker arms 215 and 216 which are fixedly secured to shafts 217 and 218 which form the pivots for the respective levers 210 and 212. The solenoid plunger 213a is also connected to a lever 219 which is fixedly secured to a shaft 220 which forms the pivot for the yoke 207. Thus, when the solenoid 213 is actuated, the lever 215 and the lever 210 work together as a bell crank so that the pin setting finger 209 may push one of the memory pins 202a to its set position, while the lever 219 and the yoke 207 act together as a bell crank to push the cancelling ring 206 in and cancel any of the pins 202a other than the one being set by the pin setting finger 209. As seen in Fig. 13, the cancelling ring 206 has a cut out portion 206a aligned with the pin setting finger 209 so that it does not cancel out the pin being set.

It is by the foregoing mechanism; i.e., the solenoid 213 acting through the pin setting mechanism 215—210—209, and through the pin cancelling mechanism 219—207—206, that a new pin on the twenty-five counter wheel 202 is set at the end of any imprinting run so that the twenty-five count for actuating the right deflector solenoid 163 of the deflector mechanism H may start over again with the first book of the new imprint run. Since the shaft 195 is rotated one turn in every twenty-five cycles, the set memory pin 202a in the wheel 202 may strike a pivoted switch arm 221 (best seen in Fig. 14) for a microswitch 222 once on every revolution. The microswitch 222 controls the circuit to the solenoid 163 for deflecting a book to the right. The location of the switch arm 221 with respect to the plunger 209 is such that the plunger must be able to rock the arm as it sets a pin 202a and the outer end of the arm has a first inclined face 221a to permit this action and a second inclined face 221b which is contacted by the set pin 202a on each revolution.

Actuation of the solenoid 214 at the end of an imprinting run acts through the levers 216 and 212 and the plunger 211 to set a memory pin 203a in the imprinting change memory wheel 203. No movable cancelling mechanism is needed for the pins 203a because each pin has completed its function when it has made only a part of a revolution, and may be cancelled by brushing against an inclined cancelling plane 223 seen in Fig. 16. Fig. 16 is somewhat diagrammatic inasmuch as the pin 203a is shown fragmentarily in seven different positions to illustrate its movement to idle position as it travels along cancelling plane 223.

Referring to Figs. 13 and 15, each of the memory pin wheels 202 and 203 is provided with a stabilizing pawl shown respectively at 224 in Fig. 13 and 225 in Fig. 15 both pawls being spring urged to hold their heads 224a and 225a respectively in engagement with the pins 202a and 203a.

The set pin 203a in the memory wheel 203 has four functions to perform before it may be cancelled out. First, as will be explained in more detail in connection with the control circuit J, it must change control of the machine from a circuit including the predetermined counter which has been in control to a circuit through the predetermined counter which has been idle. This it does by means of a Geneva wheel 226 best seen in Fig. 15 which is rotatably mounted where its pin receiving slots 226a may be engaged by the one set pin 203a of the imprint change memory wheel 203. The Geneva wheel has six high spots 226b separated by six low spots 226c, and a pivoted Geneva wheel follower 227 is provided with a roller 228 which rides over the outer surface of the Geneva wheel so that at any given time it is either on a high spot 226b or a low spot 226c. The follower 227 is held in engagement with the surface of the Geneva wheel by means of a tension spring 229. As the set pin 203a engages a slot 226a of the Geneva wheel, it turns the wheel far enough to move the Geneva wheel follower 228 from a high spot 226b to a low spot 226c or vice versa as the case may be. The follower 227 is provided with a switch actuating arm 230 which has a pair of pins 231 and 232 (Fig. 12), the pin 231 acting upon a microswitch 233 and the pin 232 acting upon a microswitch 234. It is the position of the microswitch 234 which determines the predetermined counter control circuit which is active while the switch 233 is in the circuit for the two-way solenoid 153 which locks out one or the other of the counters 151 and 152. As shown in Fig. 17, the circuit including counter 151 is in control when the Geneva wheel follower 227 is on a high spot 226b, while the circuit including counter 152 is in control when the follower is on a low spot 226c.

On each movement back and forth, the Geneva wheel follower 227 brushes across the switch finger 235a of a microswitch 235 for a purpose which will be explained in connection with the control circuit J. The Geneva wheel is stabilized by a stabilizer arm 236 which has a wheel 237 riding over the notches 226a in the wheel.

The next function of the imprint change memory wheel pin 203a is to actuate the solenoid 132 which controls the single revolution dog clutch in the cam control mechanism F which effects the reversal of position of the back imprinting rollers 75 and 76. As previously pointed out in connection with the cam control mechanism F, it is necessary for the change of the back imprint rollers to take place three cycles after the front imprint rollers are changed. This is accomplished by actuating the solenoid 131 for the front rollers directly from the control counter switch; while to switch the back rollers the set memory control pin 203a contacts the switch plunger 236a of a microswitch 236 which closes the circuit to said solenoid 132. In order to get the necessary time lag, the pin 203a contacts the plunger 236a for the microswitch 236 two cycles after it has first been set and has engaged the Geneva wheel 226.

The third operation to be performed by the pin 203a of the imprint change memory wheel 203 is to close the circuit to the solenoid 187 in the book deflector mechanism H, to engage the latch 185 with the cam follower arm 162 so as to deflect a book to the left. This it accomplishes by striking the plunger switch finger 237a of a microswitch 237. The distance from the point at which the count of books is made by the counter in mechanism G, and that where the deflector mechanism count of books is made is 11 cycles; i.e., there are 11 books in the machine between the first counter and the last counter. Thus, although the imprint change memory pin 203a is set immediately upon termination of a predetermined count, the book which is at the front counter at that time will not reach the deflector at the outfeed for 11 cycles, so the microswitch 237 is set around the wheel 203 eleven spaces from the pin setting plunger 211. Since the shaft 195 on which the two memory wheels 202 and 203 are mounted may turn only as it is actuated by the pawl 193 on the bell crank 190 working through the ratchet 194, the advancing of the memory pin 203a always coincides precisely with the number of books reaching the outfeed.

The fourth operation to be performed by the pin 203a is to actuate solenoid 213 to cancel any set pin 202a in the twenty-five count wheel 202, and set a new pin 202a. This is also done by closing switch 237 so that the pins 202a are cancelled and reset as the last book on an imprint run is deflected, and the new count of twenty-five starts with the first book of the new run.

IX. Control circuits

The operation of the machine, and the electric control circuits for the machine are shown in the form of a pictorial diagram in Fig. 17 from which the sequence of operations of the unit may best be described. It will be seen that Fig. 17 shows diagrammatically all of the control and actuating elements heretofore referred to in connection with the roller cam actuating mechanism F shown in Figs. 4, 5, and 6, the counter and counter actuating mechanism G shown in Figs. 7, 8, and 9, the book deflector mechanism H shown in Figs. 10 and 11; and the memory control mechanism I shown in Figs. 12 to 16 inclusive. Thus, in the lower left part of Fig. 17 from the cam mechanism F are shown the four-toothed clutch dog 126 and clutch dog 128 together with their control solenoid 131 for reversing the positions of the front imprinting rollers and the corresponding four-toothed clutch 132b and clutch dog 132a together with their control solenoid 132.

In the upper left, from the counter mechanism G, are shown the predetermined counter fingers 151a and 152a together with the two-way solenoid 153 which in Fig. 17 appears as two solenoids designated 153a and 153b, and the counter deactivator arm 155 under the control of the solenoid 153a–b. Also, shown in the rectangular wiring diagram at the top, are switches 151s and 152s which are embodied in the predetermined counters 151 and 152.

At the bottom right center, from the book deflector mechanism H are shown the solenoids 163 and 187 which control deflection of books to the right and to the left respectively.

In the lower right portion, from the memory control mechanism I, are shown the twenty-five count memory pin wheel 202 with its set pin 202a indicated in black, together with the cancelling ring 206 and the pin setting plunger 209 and their operating linkages, plus their operating solenoid 213 which is here shown for convenience as two separate solenoids, numbered 213a and b, to show its dual function. Alongside the wheel 202 is switch 222, which actuates twenty-five count book deflector solenoid 163. At the right center is the imprint change memory wheel 203 with its set pin 203a shown in black, the Geneva wheel 226 with its stabilizing arm 236 and the Geneva wheel follower 227 with its roller 228, and the operating plungers 231 and 232 for the microswitches 233 and 234 respectively and the snap switch 235, all operated by the Geneva wheel follower 227. Adjacent the Geneva wheel is the microswitch 236 which is operated by the set pin 203a to activate the solenoid 132 to initiate reversal of the back imprint rollers, and further around at about four o'clock on the wheel 203 is the switch 237 operated by the memory pin 203a to activate both the left book deflector solenoid 187 and the solenoid 213a–b to reset pins 202a.

The inclined cancelling plane 223 is indicated by the series of arrows within the wheel 203.

In addition to the foregoing elements, we find the various components of the control circuits J which will now be described in detail.

The control circuit J includes a pair of parallel preliminary circuits $J^1$ and $J^2$ which are operated through the switches 151s and 152s in predetermined counters 151 and 152, respectively, and a main circuit $J^3$ which is placed selectively into communication with $J^1$ or $J^2$ by switch 234 as said switch is reversed by the action of the Geneva wheel 226 and its follower 227 to transfer operation from one preliminary circuit to the other at an imprint change.

The circuit $J^1$ contains a double contact relay 239 having a first switch plate 239a which moves between relay holding contacts 239c in parallel with a push button switch 240, and contacts 239e for a pilot light 241; and a second plate 239b which moves between contacts 239d in circuit $J^1$ and contacts 239f in an antifeedback circuit $J^4$. Circuit $J^2$ contains similar elements in the form of a relay 242 having switch plates 242a and b which move respectively between contacts 242c and e, and between contacts 242d, and f, similarly to the plates in relay 239; circuit $J^2$ also including a push button switch 243 and a pilot light 244. Leads into the circuit J come through wires 245 which are in series with the start-stop circuit (not shown) for the magnetic clutchbrake unit for driving or stopping the machine.

As seen in Fig. 17, the arm of switch 234 is against contact 234a, so that control is through circuit $J^1$. This means that counter 151 is the control counter, and counter 152 is idle. When the operator set up a predetermined number on the counter 151, it automatically set switch 151s against a contact 151b in the holding circuit for relay 239. The operator then pressed push button 240 which momentarily closed the circuit to relay 239, drawing the relay to the position shown in Fig. 17 with its two switch plates 239a and 239b against contacts 239c and 239d, respectively, thus conditioning circuit $J^1$ and extinguishing pilot light 241. Counter deactivator arm 155 is locking out counter finger 152a, and counter finger 151a is recording the books entering the machine on counter 151.

Similarly, setting up a number on counter 152 closes the holding circuit for relay 242, and pushing the button for switch 243 sets the switch plates 242a and b of relay 242 against contacts 242c, and d, respectively, conditioning circuit $J^2$ and extinguishing pilot light 244.

The antifeedback circuit $J^4$ includes contacts 239f and 242f, a double contact relay 247, a normally closed manual switch 248, a pilot light 249, and the switch 235 which is momentarily closed by the tip of the Geneva follower 227 each time the follower reverses position.

At the end of the current imprinting run, switch 151s is reversed by the counter 151 reaching the predetermined count. This closes contact 151c, completing circuit $J^1$, and opens contact 151b to break the relay actuating circuit, dropping relay switch plates 239a and b against contacts 239e and f, respectively. This lights pilot light 241, and closes contacts 239f in the antifeedback circuit $J^4$.

With contact 151c closed, current flows through circuits $J^1$ and $J^3$ through contacts 151c, 234a, and 247c which are closed by a plate 247a in antifeedback relay 247. Current passes through a normally closed snap switch 250 to momentarily actuate solenoid 131 for four-tooth clutch dog 128 to initiate reversal of the front imprinting rollers 65 and 68. If manual actuation of solenoid 131 is desired, snap switch 250 may be thrown to a second position to connect the solenoid directly to the source of electric power.

The remaining operations performed by closing of counter switch 151s requires very precise timing, so circuit $J^5$ which feeds solenoid 214 for setting a pin 203a in imprint change wheel 203 is controlled by an overriding trigger switch 252 which is closed once in every cycle of the machine by a cam 253 on the driven shaft 88, this being the shaft which also carries the delivery belt 86 and deflector cam 157 of the book deflector mechanism H. Closing of trigger switch 252 actuates side 153b of double solenoid 153 to reverse the position of counter deactivator arm 155, locking out 151a and releasing 152a. It also activates solenoid 214 to set a pin 203a on imprint change memory wheel 203. The engagement of the set pin 203a with Geneva wheel 226 moves the wheel to reverse the position of Geneva wheel follower 227, thus reversing switches 233 and 234 to close contacts at 233b and 234b, making primary circuit $J^2$ the control circuit and readying main circuit $J^3$ for inclusion with $J^2$ through said contact 234b.

After two cycles, pin 203a closes microswitch 236 sending current through a normally closed snap switch 254 to momentarily activate solenoid 132 and thus initiate reversal of back imprinting rollers 75 and 76. Like snap switch 250, snap switch 254 may be manually moved to a second position to connect associated solenoid 132 with the source of electric power, and thereby initiate reversal of the back rollers.

After eleven cycles, pin 203a strikes the switch plunger 237a of microswitch 237. Switch 237 is a double pole switch with a normally closed contact 237b and a normally open contact 237c, and is a part of a circuit $J^6$ for cancelling and setting pins in the twenty-five memory wheel 202 and for actuating book deflector solenoids 163 and 187 in deflector mechanism H. In Fig. 17, set pin 203a is at switch 237, so contact 237b is open and 237c is closed to activate solenoid 213 and thus operate the pin setting plunger 209 and the cancelling ring 206 for twenty-five count wheel 202. Again, to achieve accurate timing of the setting of pin 202a, the circuit J⁶ is provided with an overriding trigger switch 256 which is closed every cycle by a cam 257 on shaft 88 to close circuit 255.

Also in circuit J⁶ is the switch 222 for actuating the twenty-five count book deflector solenoid 163, controlled by contact of a set pin 202a on the twenty-five count wheel 202. The deflector solenoid 187 for indicating the end of an imprint run is actuated by closing of the contact 237c, at the same time that solenoid 213 is actuated to set and cancel pins in the twenty-five wheel 202.

The circuit for the book deflector solenoids 163 and 187 is such that if an imprinting run contains an even multiple of twenty-five books the solenoid 187 will be actuated, but not the solenoid 163, so that the deflector will correctly indicate the end of a run. This is by reason of the fact that switch 222 is in series with the normally closed contacts 237b of switch 237, so that closing of switch 222 when 237b is open (at the time of an imprint change) does not energize solenoid 163. Instead solenoid 187 is energized on account of the closing of 237c by the pin 203a.

The antifeedback system including relay 247 is to take care of the situation which would exist if a run under the control of one counter and one circuit were to end before the operator had completed the changing of the imprinting plates on the idle rollers and the resetting of the idle counters. We have previously assumed a condition in which counter 151 had been in control, but ran out its count to switch circuits from J¹ to J² and to deactivate relay 239 which closes relay switch plate 239a to energize pilot light 241, and also closes switch plate 239b across contacts 239f in antifeedback circuit J⁴. However, as long as counter 152 is properly set and operating in its control capacity, antifeedback circuit is broken at contacts 242f of relay 242. If, at the end of the run under control of counter 152, the idle imprinting rollers and counter 151 were not ready, movement of switch 152s would close the antifeedback circuit J⁴ through contacts 242f and relay switch plate 242b, putting current to one side of switch 235. Under these conditions, the front imprint rollers would reverse as usual; but before switches 233 and 234 could reverse by movement of the Geneva wheel, follower 227 would close switch 235 to activate antifeedback relay 247, opening circuit J³ at contacts 247c and lighting pilot light 249 by closing contacts 247b. Operation of the machine could be resumed only upon setting of the counter 151 or 152 and pressing the appropriate snap switch to break the antifeedback circuit at the relay controlled by said snap switch. Then, in order to close the circuit J³ it is necessary to open normally closed manual switch 248 and break the holding circuit for antifeedback relay 247, permitting the relay to return to the position of Fig. 17. This also extinguishes pilot light 249 to show that the unit is ready to return to service.

Fig. 17 also shows at the extreme bottom a deflected book b25, with an arrow leading to the pin which actuated switch 222 to deflect the book, said pin having just been cancelled by ring 206 when plunger 209 set the new pin 202a, shown in black. Thus, also shown is a "b, last" which has just been deflected to mark the end of an imprinting run.

X. *Manual control mechanism and imprint roller clutch mechanism*

After a front imprint roller and a rear imprint roller have been moved to idle position, they continue to rotate in synchronization with the rollers which have moved to imprinting position, and they are positioned so close to the inking roller that it is difficult for an operator to change the imprinting plates on the idle imprint rollers. Thus, manual control and clutch mechanism K is for manually stopping the idle imprint rollers so that the imprinting plates may be changed, and for moving the idle imprint rollers to a throwout position clear of the inking rollers.

Referring to Fig. 18, the synchronous drive for shaft 65a upon which is mounted the front lower imprinting roller 65 is through a gear train off the shaft 67 about which the rocker arm 66 for said imprinting roller may be rocked by means of its mounting sleeve 258 which is journalled on shaft 67. The outer end of the shaft 67 is supported in an appropriate trunnion 67a in an outside frame member and is provided with a drive gear 67b. A clutch member 259 is mounted on bearings 259a on the shaft 67 and is adapted to cooperate with a sliding clutch mechanism 260 keyed on the shaft 67. The clutch member 259 on the sleeve 258 includes a gear 261 which meshes with an idler gear 262 journalled on a stub shaft in the rocker arm 66, which in turn meshes with a gear 263 on the shaft 65a.

It is essential that the relative positions of the two imprinting rollers of any pair remain constant so that the rollers may print in precisely the same spot on a book supported upon the imprinting cylinder associated with said rollers. To accomplish this synchronization, the clutch mechanism which includes the clutch member 259 and sliding clutch 260 also includes an idle clutch synchronizing cylinder 264 which is mounted on a suitable fixed bracket 265 on a stay shaft 266. Assuming the clutch member 259 and sliding clutch 260 to be disenengaged as is shown in Fig. 18, the imprint roller 65 would, of course, be stationary. Suitably connected to the sliding clutch 60 is a clutch actuating fork 267 which is pivoted at 268 on a bracket and is connected to a spring loaded clutch control rod 269 having a knot 270 on the outside of the frame where it may be manually manipulated to slide the clutch member 260 in and out.

The idle clutch synchronizing cylinder 264 is provided with a metal drive ring 271 and a leather drive ring 272 which is slightly smaller than the ring 271 and which is continually in frictional driving engagement with a mating drive ring 273 on the clutch member 259 of the sleeve 258. On the sliding clutch 260 is a rubber drive ring 274 which is adapted to make frictional driving engagement with the metal ring 271 on the idle clutch synchronizing cylinder 264 when the sliding clutch 260 is moved in. The difference in diameter between the drive rings 271 and 272 on the clutch synchronizing cylinder 264 causes the clutch member 259 to rotate at a ratio of 10:9 with respect to the clutch member 260, so that a positive drive clutch pin 275 on the member 259 may slide around the face of the sliding clutch member 260 until it "finds" a complementary positive drive aperture 276 in the sliding clutch member 260. The sliding clutch is constantly urged toward the clutch member 259 by action of the spring loading on the clutch control rod 269, so when the pin 275 "finds" the aperture 276, the spring pushes the aperture around the pin and the rubber clutch ring 274 overrides the metal drive ring 271 on the idle clutch synchronizing cylinder 264. The clutch member 259 and associated gears are positively driven, and the frictional drive is no longer operated except as the synchronizing cylinder 264 is carried idly with the member 259 by reason of the continuing frictional engagement between the leather drive sleeve 272 and the metal drive ring 273.

As a result of the action of the synchronizing clutch members, after an imprinting plate is changed and the clutch is re-engaged, the imprinting roller comes back into perfect synchronization with the roller at imprinting position which has rotated continuously.

In connection with the cam control mechanism F for the imprinting rollers, it was stated that the control cam, seen in Figs. 2 and 5, operates through a suitable actuating rod 120 and linkage 121 to effect movement of the rocker arm 66 for the imprinting roller 65, and that the other cam controls operate through similar actuating rods and linkages to move the rocker arms for the other imprinting rollers. The details of the linkage 121 are shown in Figs. 19 and 20 insofar as they relate to the manual throwout means for swinging the imprinting rollers to a position away from the inking rollers for the purpose of changing imprinting plates.

The linkage 121 includes a pair of clutch sleeves 277 and 278 mounted on a clutch support rod 279 which engage through overlapping teeth 280 and 281. The actuating rod 120 has its upper end connected to a laterally projecting finger 282 on the clutch sleeve 277 (Fig. 20) and a plate 283 on the clutch sleeve 278 serves as a mounting for a link 284 which makes pivotal connection with a tie rod 285 between the rocker arms 66 for the imprinting roller 65. Also secured to the plate 283 is a spring plunger rod 286 the lower end of which extends into a spring casing 287 which is supported on a suitable bracket 288 on the same frame members which support the actuating rod guide 120a. Inside the spring casing 287 is a heavy compression spring 288 which bears on a spring follower 289 on the bottom of the spring plunger rod 286. Thus, the plate 283, and consequently the rocker arm 66, are continually urged upwardly by the action of the compression spring 288. The action of the link 120 when the cam follower 116 is forced down by the cam 110 rocks the arm 66 against the compression of the spring 288.

The use of mating clutch sleeves 277 and 278 permits the rocker arm 66 to be swung out an additional distance against the compression of the spring 288 by turning a manual control handle 290 which is secured to a rotatable stub shaft 291 mounted in a side frame member and an adjacent bracket below the clutch support rod 279. On the stub shaft 291 is a pinion 292 which engages a gear segment 293 on the clutch sleeve 278. Thus, swinging the manual control handle 290 to the right as seen in Fig. 20 will rotate the clutch sleeve 278, separating the teeth 281 from the teeth 280, and swinging the plate 283 down against the force of compression spring 288 to rock the rocker arm 66 about the shaft 67.

The positioning of the elements gives the rocker arm 66 an over-centering action as it is swung down by the operation of the handle 290 so that it stays in its swung out position until manually returned by movement of the handle 290.

At the end of an imprinting run, the operator first pushes in the clutch control knob 270 to disengage the clutch members 259 and 260, stopping the rotation of the imprinting roller 65. He may then swing the manual control handle 290 to move the imprinting roller to a position where it may conveniently be manipulated to change imprinting plates, and when the new plate is in place, the operator returns the roller to its former idle position by use of the handle 290 and then reengages the synchronizing clutch members 259 and 260 by moving the clutch control member 270. Having performed these operations, he resets the idle predetermined counter to the appropriate number of impulses for the next imprinting run and presses the appropriate manual spring switch 240 or 243, as the case may be, to condition the preliminary circuit $J^1$ or $J^2$, as the case may be. The pilot lights 241 and 244 serve as a reminder to the operator of the necessity of pushing the manual control button, which extinguishes the pilot light.

This application is a continuation of our co-pending application 451,502, filed August 23, 1954, and now abandoned.

The foregoing detailed description is given for clearness of understanding only and no unnecessary limitations are to be understood therefrom, as some modifications will be obvious to those skilled in the art.

We claim:

1. In an imprinting machine, in combination: impression cylinder means for carrying sheets while they are imprinted seriatim; a pair of imprinting rollers adjacent said cylinder means mounted for movement between an imprinting position and an idle position, said rollers being adapted to receive removable imprinting plates, one of said rollers being in each position at any given time, whereby the roller in idle position may receive a new plate while the roller in imprinting position is printing; counter means for counting the sheets passing to the cylinder means, said counter means being adapted to receive a series of preselected counts; and shifter means under the control of said counter means for reversing the positions of the rollers after any preselected count of sheets has passed seriatim to the cylinder means whereby the imprinting machine may run continuously through a series of preselected counts containing varying preselected numbers of sheets.

2. In an imprinting machine, in combination: feeding means for continuously delivering sheets seriatim in evenly spaced relationship; front impression cylinder means for carrying sheets delivered by said feeding means while the fronts of said sheets are imprinted; back impression cylinder means for carrying said sheets while their backs are imprinted, said back cylinder means being a predetermined number of sheets behind said front cylinder means; a pair of front imprinting rollers operatively associated with said front cylinder means and movable between an imprinting position and an idle position, said rollers being adapted to receive removable imprinting plates and one of said rollers being in each position at any given time so that the roller in idle position may receive a new plate while the roller in imprinting position is imprinting the fronts of the sheets; a pair of back imprinting rollers operatively associated with said back cylinder means and movable between an imprinting position and an idle position, said rollers being adapted to receive removable imprinting plates and one of said rollers being in each position at any given time so that the roller in idle position may receive a new plate while the roller in imprinting position is imprinting the backs of the sheets; counter means for counting the sheets passing to the front cylinder means, said counter means being adapted to receive a series of preselected counts; and shifter means under the control of said counter means which includes first shifter mechanism for reversing the positions of the two front rollers after the fronts of any preselected count of sheets have been imprinted and second shifter mechanism for reversing the positions of the two back rollers after the backs of said preselected count have been imprinted, whereby the imprinting machine may operate continuously through a series of preselected counts.

3. In an imprinting machine, in combination: feeding means for delivering sheets seriatim in evenly spaced relationship to impression cylinder means; impression cylinder means adapted to carry said sheets in said evenly spaced relationship as they are successively imprinted; a pair of imprinting rollers associated with said cylinder means and mounted for movement between an imprinting position and an idle position, said rollers being adapted to receive removable imprinting plates, one of said rollers being in each position at any given time whereby the roller in idle position may receive a new plate while the roller in imprinting position is printing; counter means for counting the sheets passing to the cylinder means, said counter means being adapted to receive a series of preselected counts; shifter means under the control of said counter means for reversing the positions of the rollers after the last sheet of any preselected count of sheets has been imprinted; outfeed means for delivering the imprinted sheets in shingled relationship; sheet deflecting means associated with the outfeed means for deflecting a single sheet in a first direction or in a second direction as said sheet moves into shingled relationship; a preselected count indicator under the control of the counter means for sensing the sheets of any preselected count as they pass through the outfeed; first actuating means controlled by said preselected count indicator for actuating the deflecting means to deflect the last sheet in a preselected count in the first direction; sheet counter means interconnected with said preselected count indicator; second actuating means controlled by said sheet counter means which is adapted to actuate the deflecting means to deflect in the second direction one sheet out of a predetermined number in any preselected count.

4. In an imprinting machine, in combination: impression cylinder means for carrying sheets while they are imprinted seriatim; a pair of imprinting rollers adjacent said cylinder means mounted for movement between an imprinting position and an idle position, said rollers being adapted to receive removable imprinting plates, one of said rollers being in each position at any given time, whereby the roller in idle position may receive a new plate while the roller in imprinting position is printing; a pair of counters each of which is adapted to receive a preselected count, one counter being a control counter at any given time and the other counter being an idle counter upon which a new preselected count may be set up; sheet sensing means for actuating the control counter to count the sheets passing to the cylinder means; shifter means under the control of the control counter to reverse the positions of the rollers upon termination of a preselected count set up on said control counter; and counter selector means for switching control counters upon completion of said preselected count, whereby the machine may imprint continuously a series of different imprint runs containing varying preselected numbers of sheets.

5. The imprinting machine of claim 4 in which there is a separate preliminary electric control circuit associated with each counter and a control circuit which may be selectively in series with either preliminary circuit, and said counter selector means includes means for switching the control circuit out of series with the control counter preliminary circuit and into series with the idle counter preliminary circuit.

6. In an imprinting machine, in combination: imprinting means including a pair of selectively alternative imprinting rollers which are alternately shiftable between an imprinting position and an idle position; sheet counter means for determining the number of sheets passing through said imprinting means; preselected counter means actuated by said sheet counter means; and means under the control of said preselected counter means for periodically shifting the positions of said imprinting rollers, whereby imprints may be changed while said machine imprints continuously a series of imprint runs containing varying preselected numbers of sheets.

7. In an imprinting machine which is adapted to receive sheets seriatim and uninterruptedly print a series of runs of different imprints in which different runs of the series may contain different numbers of sheets, means for differentiating successive runs and counting the sheets in each run, comprising: counter means for counting the sheets entering the machine, said counter means being adapted to receive a series of preselected counts; outfeed means for delivering the imprinted sheets in shingled relationship; sheet deflecting means associated with the out-feed means for deflecting a single sheet in a first direction or in a second direction as said sheet moves into shingled relationship; a preselected count indicator under the control of the counter means for sensing the sheets of any preselected count as they pass through the outfeed; first actuating means controlled by said preselected count indicator for actuating the deflecting means to deflect the last sheet in a preselected count in the first direction; sheet counter means interconnected with said preselected count indicator; and second actuating means controlled by said sheet counter means which is adapted to actuate the deflecting means to deflect in the second direction one sheet out of a predetermined number in any preselected count.

8. The device of claim 7 in which the preselected count indicator comprises a predetermined number memory pin wheel having a plurality of movable pins in combination with means for setting a pin on said wheel at the beginning of an imprint run and for cancelling said pin after an established number of imprints has been made in said run.

9. The device of claim 8 in which the sheet counter means includes a memory pin wheel having a plurality of movable pins and means for setting a pin on said wheel at the beginning of each imprint run.

10. The device of claim 7 in which the actuating means for the sheet deflecting means includes a first solenoid for deflecting a sheet in the first direction, a second solenoid for deflecting a sheet in the second direction, and the circuits for said solenoids are interconnected so that closing the circuit to said first solenoid breaks the circuit to the second solenoid.

11. In an imprinting machine, in combination: sheet feeding means for delivering sheets seriatim in evenly spaced relationship to impression cylinder means; fixedly positioned rotary impression cylinder means for supporting said sheets during imprinting; a pair of imprinting rollers associated with said impression cylinder means mounted for movement between an imprinting position and an idle position, said rollers being adapted to receive removable imprinting plates, one of said rollers being in each position at any given time; positive drive means for driving each of said rollers while in both positions; manually actuated means for disengaging said positive drive means from a roller in idle position; and synchronous friction clutch means including differentially rotatable friction members to synchronize the idle roller with the imprinting roller as said positive drive means is re-engaged, said friction means being disengaged upon engagement of the positive drive.

12. In an imprinting machine, in combination: sheet feeding means for delivering sheets seriatim in evenly spaced relationship to impression cylinder means; impression cylinder means for supporting said sheets during imprinting; a pair of imprinting rollers associated with said impression cylinder means, each roller being mounted on a rocker arm and being adapted to receive removable imprinting plates; means for automatically moving said rollers between idle and imprinting positions so one of said rollers is in each position at any given time; manual means for swinging each rocker arm from idle position to an imprint plate change position; means for driving both said rollers while in imprinting and idle positions; and manually controlled synchronous clutch means for selectively stopping a roller in idle position to receive a new plate, said clutch means being adapted to synchronize the idle roller with the imprinting roller as it is re-engaged.

13. In an imprinting machine, in combination: impression cylinder means for carrying sheets while they are imprinted seriatim; a pair of imprinting rollers adjacent said cylinder means mounted for movement between an imprinting position and an idle position, said rollers being adapted to receive removable imprinting plates, one of said rollers being in each position at any given time, whereby the roller in idle position may receive a new plate while the roller in imprinting position is printing; a single inking roller for the pair of imprinting rollers, said inking roller being positioned to be contacted by the roller in imprinting position and not by the roller in idle position; counter means for counting the sheets passing to the cylinder means, said counter means being adapted to receive a series of preselected counts; and shifter means under the control of said counter means for reversing the positions of the rollers after any preselected count of sheets has passed seriatim to the cylinder means whereby the imprinting machine may run continuously through a series of preselected counts containing varying preselected numbers of sheets, said shifter means being constructed and arranged to move the roller in idle position into contact with the inking roller a predetermined number of imprints before it reverses the positions of the imprinting rollers.

14. In an imprinting machine, in combination: impression cylinder means for carrying sheets while they are imprinted seriatim; a pair of imprinting rollers adjacent said cylinder means mounted for movement between an imprinting position and an idle position, said rollers being adapted to receive removable imprinting plates, one of said rollers being in each position at any given time, whereby the roller in idle position may receive a new plate while the roller in imprinting position is printing; inking means adapted to be contacted by the roller in imprinting position and not by the roller in idle position, counter means for counting the sheets passing to the cylinder means, said counter means being adapted to receive a series of preselected counts; and shifter means under the control of said counter means for reversing the positions of the rollers after any preselected count of sheets has passed seriatim to the cylinder means whereby the imprinting machine may run continuously through a series of preselected counts containing varying preselected numbers of sheets, said shifter means being constructed and arranged to move the roller in idle position into contact with the inking means a predetermined number of imprints before it reverses the positions of the imprinting rollers.

15. An imprinting machine comprising: cylinder means for carrying sheets to be imprinted seriatim; a pair of imprinting rollers adjacent said cylinder means mounted for movement between an imprinting position and an idle position, said rollers being adapted to receive removable imprinting plates, one of said rollers being in each position at any given time, whereby the roller in idle position may receive a new plate while the roller in imprinting position is printing; a pair of counters each of which is adapted to receive a preselected count, one counter being a control counter at any given time and the other counter being an idle counter upon which a new preselected count may be set up; means for actuating the control counter to count the sheets passing to the cylinder means; shifter means under the control of the control counter to reverse the positions of the rollers upon termination of a preselected count set up on said control counter; a preliminary electric control circuit associated with each counter; a control circuit which may be selectively in series with either preliminary circuit; an anti-feedback circuit including a relay which affords normally closed switch means in the control circuit and an open contact in each preliminary circuit; a relay associated with each counter which is adapted to close one of said open contacts in the anti-feedback circuit upon completion of a preselected count on said counter; counter selector means for switching control counters upon completion of a preselected count, said selector means including means for switching the control circuit out of series with the control counter preliminary circuit and into series with the idle counter preliminary circuit; and switch means under the control of said counter selector means for closing said antifeedback circuit when both said open contacts are closed to energize the antifeedback relay and open said normally closed switch means to deactivate the control circuit.

16. In an imprinting machine, in combination: sheet supporting means for carrying sheets seriatim through an imprinting operation to an outfeed; infeed sheet counting means; outfeed sheet counting means a fixed number of sheets behind said infeed sheet counting means; two imprinting rollers which are shiftable between an idle position and an imprinting position, one of said rollers being in each position at any given time; means controlled by said infeed counting means for shifting said rollers; and means controlled by both said counting means for shifting selected sheets at the outfeed to visually indicate the last sheet imprinted before the rollers are shifted and every twenty-fifth sheet thereafter until the rollers are shifted again.

17. In an imprinting machine, in combination: feeding means for continuously delivering sheets seriatim in evenly spaced relationship to impression cylinder means; impression cylinder means for carrying said sheets while they are imprinted; a pair of imprinting rollers adjacent said cylinder means mounted for movement between an imprinting position and an idle position, said rollers being adapted to receive removable imprinting plates, one of said rollers being in each position at any given time, whereby the roller in idle position may receive a new plate while the roller in imprinting position is printing; counter means for counting the sheets passing to the cylinder means, said counter means being adapted to receive a series of preselected counts; and shifter means under the control of said counter means for reversing the positions of the rollers after any preselected count of sheets has passed seriatim to the cylinder means whereby the imprinting machine may run continuously through a series of preselected counts containing varying preselected numbers of sheets.

18. In an imprinting machine, in combination: feeding means for delivering sheets seriatim in evenly spaced relationship to impression cylinder means; impression cylinder means for carrying said sheets while they are imprinted; a pair of imprinting rollers adjacent said cylinder means mounted for movement between an imprinting position and an idle position, said rollers being adapted to receive removable imprinting plates, one of said rollers being in each position at any given time, whereby the roller in idle position may receive a new plate while the roller in imprinting position is printing; a pair of counters each of which is adapted to receive a preselected count, one counter being a control counter at any given time and the other counter being an idle counter upon which a new preselected count may be set up; sheet sensing means for actuating the control counter to count the sheets passing to the cylinder means; shifter means under the control of the control counter to reverse the positions of the rollers upon termination of a preselected count set up on said control counter; and counter selector means for switching control counters upon completion of said preselected count, whereby the machine may imprint continuously a series of different imprint runs containing varying preselected numbers of sheets.

19. In an imprinting machine, in combination: imprinting means including a pair of selectively alternative imprinting rollers which are alternately shiftable between an imprinting position and an idle position; sheet carrying means for carrying sheets seriatim in evenly spaced relationship to be imprinted by the roller which is in imprinting position; sheet counter means for determining the number of sheets passing through said imprinting means; preselected counter means actuated by said sheet counter means; and means under the control of said preselected counter means for periodically shifting the positions of said imprinting rollers, whereby imprints may be changed while said machine imprints continuously a series of imprint runs containing varying preselected numbers of sheets.

20. In an imprinting machine, in combination: sheet feeding means for delivering sheets seriatim in evenly spaced relationship to impression cylinder means; impression cylinder means for supporting said sheets during imprinting; a pair of rocker arms associated with said impression cylinder means; an imprinting roller on each arm to receive removable imprinting plates; means for automatically moving said arms between an imprinting position and an idle position so that one roller is in each position at any given time; positive drive means for driving each of said rollers while in both positions; manually actuated means for disengaging said positive drive means from a roller in idle position; manually actuated means for swinging each rocker arm from idle position to an imprint plate change position; and synchronous friction clutch means including differentially rotatable friction members to synchronize the idle roller with the imprinting roller as said positive drive means is re-engaged in the idle position of the rocker arm.

21. In an imprinting machine, in combination: means to support pieces while they are imprinted seriatim; a pair of imprinting rollers adjacent said support means mounted for movement between an imprinting position and an idle position, only one of said rollers being in imprinting position at any given time and said one roller then applying a first particular imprint to a set of said pieces; power driven shifter means for reversing the positions of said rollers so that the other of said rollers may apply a second particular imprint to a succeeding set of said pieces; initiator means to automatically initiate operation of said shifter means in correlation with the number of pieces which have passed a given point in the machine; and manual control means for initiating operation of said shifter means independently of said initiator means.

22. The device of claim 21 which includes means for distinguishing every $n$th piece which leaves the machine, $n$ being a whole number greater than 1, and means triggered by said initiator means for resetting said last named means in timed relationship with each automatic initiation of the shifter means, so as to distinguish every $n$th piece after the last which bears a particular imprint.

23. In an imprinting machine, in combination: means to support pieces while they are imprinted seriatim; a pair of imprinting rollers adjacent said support means mounted for movement between an imprinting position and an idle position, only one of said rollers being in imprinting position at any given time and said one roller then applying a first particular imprint to a set of said pieces; power driven shifter means for reversing the positions of said rollers so that the other of said rollers may apply a second particular imprint to a succeeding set of said pieces; an electric control circuit for initiating operation of said shifter means; first switch means in said circuit which is automatically moved to initiate operation of said shifter means in correlation with the number of pieces which have passed a given point in the machine; and a manual switch in said circuit for initiating operation of said shifter means independently of the movement of said first switch.

24. In an imprinting machine, in combination: means to support work pieces while they are imprinted seriatim; a pair of imprinting rollers adjacent said support means mounted for movement between an imprinting position and an idle position, only one of said rollers being in imprinting position at any given time and said one roller then applying a first particular imprint to a set of said pieces; power driven shifter means for reversing the positions of said rollers so that the other of said rollers may apply a second particular imprint to a succeeding set of said pieces; means for counting pieces passing through the machine; initiator means under control of the counting means for automatically initiating operation of said shifter means when the counting means reaches a predetermined number; and manual control means for initiating operation of said shifter means independently of said counting means.

25. The device of claim 24 which includes means under control of said counting means for distinguishing every $n$th piece which leaves the machine, $n$ being a whole number greater than 1, and means actuated by the counting means for resetting said last named means in timed relationship with each automatic initiation of the shifter means, so as to distinguish every $n$th piece after the last which bears a particular imprint.

26. In an imprinting machine, in combination: means to carry work pieces passing through the machine in evenly spaced relationship, said means including support means to support said pieces while they are imprinted seriatim; a pair of imprinting rollers adjacent said support means mounted for movement between an imprinting position and an idle position, only one of said rollers being in imprinting position at any given time and said one roller then applying a first particular imprint to a set of said pieces; power driven shifter means for reversing the positions of said rollers so that the other of said rollers may apply a second particular imprint to a succeeding set of said pieces; initiator means to automatically initiate operation of said shifter means intermittently in correlation with the passing through the machine of sets of pieces containing various predetermined numbers of pieces, so that the machine may continuously apply different imprints to a succession of sets of pieces; first indicating means actuated in timed relationship with the operation of said shifter means for distinguishing the last piece of a set; and second indicating means for distinguishing every $n$th piece in each set, $n$ being a whole number greater than 1.

27. In an imprinting machine, in combination: means to carry work pieces passing through the machine in evenly spaced relationship, said means including support means to carry said pieces while they are imprinted seriatim; a pair of imprinting rollers adjacent said support means mounted for movement between an imprinting position and an idle position, only one of said rollers being in imprinting position at any given time and said one roller then applying a first particular imprint to a set of said pieces; power driven shifter means for reversing the positions of said rollers so that the other of said rollers may apply a second particular imprint to a succeeding set of said pieces; initiator means to automatically initiate operation of said shifter means in accordance with the number of pieces which have passed a given point in the machine, so that the machine may continously apply a succession of different imprints to successive sets of pieces passing therethrough; first indicating means actuated in timed relationship with the operation of said shifter means for distinguishing the last piece in each set; and second indicating means for distinguishing every $n$th piece in each set, $n$ being a whole number greater than 1.

28. The device of claim 27 which includes means triggered by the initiating means to reset the second indicating means in correlation with the operation of the first indicating means.

29. In an imprinting machine, in combination: means to support work pieces while they are imprinted seriatim; a pair of imprinting rollers adjacent said support means mounted for movement between an imprinting position and an idle position, only one of said rollers being in imprinting position at any given time and said one roller then applying a first particular imprint to a set of said pieces; conveyor means for carrying pieces from said support means to a machine outfeed; power driven shifter means for reversing the positions of said rollers so that the other of said rollers may apply a second particular imprint to a succeeding set of said pieces; initiator means to automatically initiate the operation of said shifter means in accordance with the number of pieces which have passed a given point in the machine so that the machine may apply a succession of different imprints to pieces passing therethrough; first deflector means at the machine outfeed which is actuated in timed relationship with the operation of said shifter means for deflecting in one direction the last piece bearing any particular imprint; and second deflector means at the machine outfeed for deflecting in the opposite direction every $n$th piece thereafter, $n$ being a whole number greater than 1.

30. In an imprinting machine, in combination: means to carry work pieces passing though the machine in evenly spaced relationship, said means including support means to support said pieces while they are imprinted seriatim; a pair of imprinting rollers adjacent said support means mounted for movement between an imprinting position and an idle position, only one of said rollers being in imprinting position at any given time; inking means positioned to contact either roller in imprinting position and in an intermediate pre-printing position, but not in idle position; power driven shifter means for reversing the positions of said rollers, said shifter means being constructed and arranged to move one roller from idle position into said intermediate pre-printing position in contact with the inking means, and thereafter to move said one roller to imprinting position and to move the other roller to idle position; and initiator means to initiate operation of said shifter means intermittently in correlation with the passing through the machine of sets of pieces containing various predetermined numbers of pieces.

31. In an imprinting machine, in combination: means to carry work pieces passing through the machine in evenly spaced relationship, said means including support means to support said pieces while they are imprinted seriatim; a pair of imprinting rollers adjacent said cylinder means mounted for movement between an imprinting position and an idle position, only one of said rollers being in imprinting position at any given time; a single inking roller adapted to contact either roller in imprinting position and in an intermediate pre-printing position, but not in idle position; power driven shifter means for reversing the positions of said rollers, said shifter means being constructed and arranged to move one roller from idle position into said intermediate pre-printing position in contact with the inking roller, and thereafter to move said one roller to imprinting position and to move the other roller to idle position; and initiator means to initiate operation of said shifter means intermittently in correlation with the passing through the machine of sets of pieces containing various predetermined numbers of pieces.

32. In an imprinting machine, in combination: means to carry work pieces passing through the machine in evenly spaced relationship, said means including support means to support said sheets while they are imprinted seriatim; alternatively operable imprinting rollers adjacent said support means; power driven shifter means for moving said rollers between an imprinting position and an idle position; and initiator means for initiating operation of said shifter means intermittently in correlation with the passing through the machine of sets of pieces containing various predetermined numbers of pieces, so that the machine may apply a succession of different imprints to successive sets of pieces, said initiator means including apparatus for timing said operation of the shifter means to occur after the last piece of a set has been imprinted.

33. In an imprinting machine, in combination: means to carry work pieces into and out of the machine in precisely spaced relationship, said means including support means to support said pieces while they are imprinted seriatim; alternatively operable imprinting rollers adjacent said support means; power driven shifter means for moving said rollers between an imprinting position and an idle position; initiator means for initiating operation of said shifter means intermittently in correlation with the passing through the machine of sets of pieces containing various predetermined numbers of pieces, so that the machine may apply a succession of different imprints to successive sets of pieces; indicator means to differentiate selectively in either of two different ways certain pieces going out of the machine; first actuating means operable in timed relationship with the operation of the shifter means to operate said indicator means to differentiate in one way the last piece bearing a particular imprint; second actuating means to operate said indicator means to differentiate in another way every $n$th piece after said last piece, $n$ being a whole number greater than 1; and means triggered by the initiator means to reset said second actuating means in conjunction with the operation of said first actuating means.

34. In an imprinting machine, in combination: means to support pieces while they are imprinted seriatim; a pair of imprinting rollers adjacent said support means mounted for movement between an imprinting position and an idle position, only one of said rollers being in imprinting position at any given time and said one roller then applying a first particular imprint to a set of said pieces; power driven shifter means for reversing the positions of said rollers so that the other of said rollers may apply a second particular imprint to a succeeding set of said pieces; and initiator means to automatically initiate operation of said shifter means in correlation with the number of pieces which have passed a given point in the machine.

No references cited.